United States Patent

May

[15] 3,700,872

[45] Oct. 24, 1972

[54] RADIX CONVERSION CIRCUITS

[72] Inventor: Frederick T. May, Austin, Tex.

[73] Assignee: International Business Corporation, Armonk, N.Y.

[22] Filed: Aug. 22, 1969

[21] Appl. No.: 852,272

Related U.S. Application Data

[63] Continuation-in-part of Ser. No. 517,764, Dec. 30, 1965, abandoned.

[52] U.S. Cl...............235/155, 340/347 DD, 235/165

[51] Int. Cl...............................................H03k 13/24

[58] Field of Search.........340/347 DD; 235/155, 165

[56] References Cited

UNITED STATES PATENTS

| | | |
|---|---|---|
| 2,620,974 | 12/1952 | Valtat.....................235/155 X |
| 2,831,179 | 4/1958 | Wright et al...........235/155 X |
| 2,928,600 | 3/1960 | Fleming ..........340/347 DD X |
| 3,120,723 | 12/1961 | Goertzel et al. ...........235/155 |
| 3,026,035 | 3/1962 | Couleur.....................235/155 |
| 3,032,266 | 5/1962 | Couleur.....................235/155 |
| 3,082,950 | 3/1963 | Hogan.......................235/155 |
| 3,151,238 | 9/1964 | Symons.....................235/155 |
| 3,257,547 | 6/1966 | Bernstein...................255/155 |

OTHER PUBLICATIONS

Grabbe et al., Handbook of Automation, Computation, and Control, Vol. 2, 1959; pp. 2-14–2-18.

*Primary Examiner*—Maynard R. Wilbur
*Assistant Examiner*—Leo H. Boudreau
*Attorney*—Hanifin and Clark and D. Kendall Cooper

[57] ABSTRACT

Data conversion circuits with optimized common hardware convert numbers expressed in a first radix C to other radices *m*1, *m*2, etc., with the mode of operation being controlled to establish a radix C to radix *m*1 conversion in one mode, a radix C to radix *m*2 conversion in another mode, etc., on a selective basis, as desired. In a first embodiment, numbers represented in a binary (base 2) radix C are converted to a base 10 (*m*1) or base 12(*m*2) representation. In a second embodiment, numbers stored in a ternary (base 3) radix C representation are converted to a base 12 (*m*1) or base 10 (*m*2) representation. The circuits are predicated upon recognition of the fact that a number represented in a first radix can be converted readily to a second radix using shared hardware if the following equation is satisfied:

$$m = C^n (PC + 1)$$

$$m = C^n X$$

In the equation, *m* represents the divisor, that is, the base or radix to which the existing data is to be converted. *C* represents the radix or base of the original data. The factors *P* and *n* are positive integers used in the equation for convenience. If any set of values for *P* and n satisfy the equation for *m* in the specified base *C* of the dividend, then division by *m* can be implemented. The determination that the equation is satisfied for any original source data is first made in order to develop the circuits appropriate for converting the source data to other radices.

10 Claims, 34 Drawing Figures

INVENTOR
FREDERICK T. MAY
BY D. Kendall Cooper
ATTORNEY.

THIRD CYCLE:
SHIFT RIGHT n POSITIONS
n = 1 FOR 10 = ($2^1$) (5)
n = 2 FOR 12 = ($2^2$) (3)

FOURTH CYCLE:
DIVIDE BY 5 (FOR 10) OR BY 3 (FOR 12) USING SUBTRACTION

SECOND CYCLE:
SUBTRACT "UNITS DIGIT" FROM
BASE 3 DATA

THIRD CYCLE:
SHIFT RIGHT n POSITIONS
1 POSITION FOR m = 12
NO POSITIONS FOR m = 10

FOURTH CYCLE:

DIVIDE BY X (X=10 FOR BASE 10, 4 FOR BASE 12)
USING SUBTRACTION

RADIX CONVERSION CIRCUITS

This is a continuation-in-part of copending application Ser. No. 517,764, filed Dec. 30, 1965, now abandoned.

Data is usually stored in computers in binary (base 2), binary coded decimal (base 10), or some variation of these number systems, such as biquinary. As is well known, the radix of any number system represents the number of digit symbols that are used to express numeric values. Besides the radices or bases 2 and 10, other radices prove useful under certain circumstances. A base 12 radix is useful to represent shillings, for example. Pounds are represented in a radix 20, as another example. An original numerical value of pence stored in base 2 (binary) thus may be converted to pence, shillings, and pounds by successive conversion processes involving a first conversion from binary base 2 to base 12 followed by a conversion of the base 12 data to base 20. Other radices that have been used in data processing environments, though to a limited extent, include the ternary (base 3), octonary (base 8) and hexadecimal (base 16).

Conversion of data represented in a first radix to a new or different radix has been attended in the prior art by considerable difficulty. Most prior art techniques involve the provision of large amounts of hardware and inordinate amounts of time in order to convert data from one radix to another.

A significant technique for converting base 2 data to base 10 data is disclosed in the copending U.S. Pat. Application Ser. No. 439,791, entitled "Radix Converter", now abandoned for continuation application Ser. No. 56,099 with Paul E. Goldsberry as inventor, and assigned to the same assignee as the present invention. The Goldsberry converter recognizes the existence of a pattern in the base 10 system to develop a units digit or remainder by convenient accumulating methods. The Goldsberry converter makes use of a division technique disclosed in U.S. Pat. Application Ser. No. 391,175, entitled "Fractionating", also invented by Paul E. Goldsberry and assigned to the same assignee, now U.S. Pat. No. 3,239,655.

The present invention represents an improvement of the Goldsberry technique and provides for the conversion of numbers represented in any radix to any other radix, so long as certain basic principles of conversion are observed.

Accordingly, an object of the present invention is to provide apparatus for converting numbers represented in any selected first radix to any other selected compatible second radix.

A further object of the invention is to provide conversion circuits enabling the conversion of numbers in a chosen radix to a different radix that bears a particular relationship to the chosen radix.

Also, an object of the present invention is to provide radix conversion circuits that may be useful for converting data from a stored representation to an intelligible representation for print out purposes or for intermediate storage and further conversion prior to utilization.

Still another object of the invention is to provide data conversion circuits that are selectively operable to perform radix conversion from a first radix to any of a number of other radices, as desired.

Also, another object of the invention is to provide radix conversion circuits that operate in a rapid and efficient manner.

In order to accomplish these and other objects of the invention, circuits are provided for converting a number represented in a first radix to a second radix or to a third radix, in a selective manner, with hardware that is commonly shared and predicated upon predetermined relationships of the radices.

In general, data is stored in a memory in a first radix C, supplied to the converting circuits in a serial fashion on an ordinal by ordinal basis for the development of a remainder or units digit, a subsequent subtraction of the units digit from the original number, and a division of the result using subtraction techniques. Facilities are provided for temporarily storing the developed remainder in order to supply the same for print out or for further conversion manipulation. The remainder is stored in the new radix, but with the principles of the present invention, it is also processed in a simple manner in the old radix. The accumulator, therefore, is adapted for arithmetic processing of both the old and new radices, as required during the conversion process.

According to the invention, numbers expressed in a first radix C are converted to other radices *m1*, *m2*, etc., with the mode of operation being controlled to establish a radix C to radix *m1* conversion in one mode, a radix C to radix *m2* conversion in another mode, etc., on a selective basis, as desired. In a first embodiment, numbers represented in a binary (base 2) radix C are converted to a base 10 (*m1*) or base 12 (*m2*) representation, on a selective basis and in an equally efficient manner. In a second embodiment of the invention, numbers stored in a ternary (base 3) radix C representation are converted to a base 12 (*m1*) or base 10 (*m2*) representation, also on a selective basis.

The foregoing and other objects, features, and advantages of the invention will be apparent from the following more particular description of the various embodiments of the invention as illustrated in the accompanying drawings.

In the drawings:

FIG. 1 represents a first cycle in converting a number represented in base 2 to a base 10 or base 12 representation.

FIG. 1*a* illustrates a mode control circuit for gating either a base 2 to base 10 conversion or a base 2 to base 12 conversion.

FIG. 2 is a clock timing sequence for the circuit of FIG. 1 as well as the circuit of FIG. 3.

FIG. 3 represents a second cycle during the conversion of base 2 data to base 10 or base 12 data wherein a units digit or remainder developed in the circuit of FIG. 1 is subtracted from the original number.

FIG. 4 shows shift circuits operative in the third cycle of conversion of base 2 data to base 10 or base 12 data.

FIG. 5 shows clock times for the circuit of FIG. 4.

FIG. 6 represents the fourth cycle of conversion of base 2 data to base 10 or base 12 data.

FIG. 7 shows circuits operable in a first cycle during the conversion of base 3 data to base 10 or base 12 data for developing a remainder or units digit.

FIG. 7*a* illustrates a mode control circuit for gating either a base 3 to base 10 conversion or a base 3 to base 12 conversion.

Figure 10:
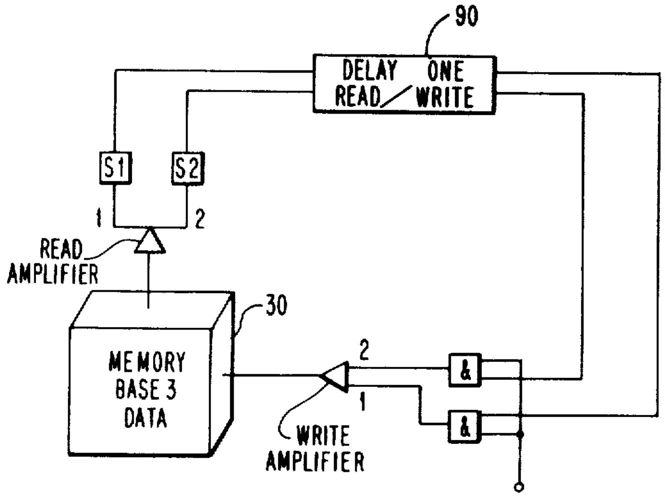

FIG. 10 illustrates shift circuits operable during the third cycle of conversion of base 3 data to base 10 or base 12 data.

Figure 11:
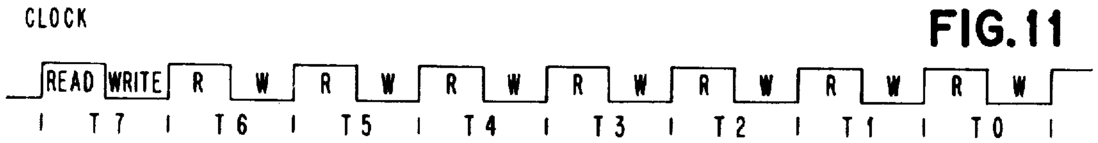

FIG. 11 shows clock timings involved in the operation of the circuit of FIG. 10.

Figure 12:
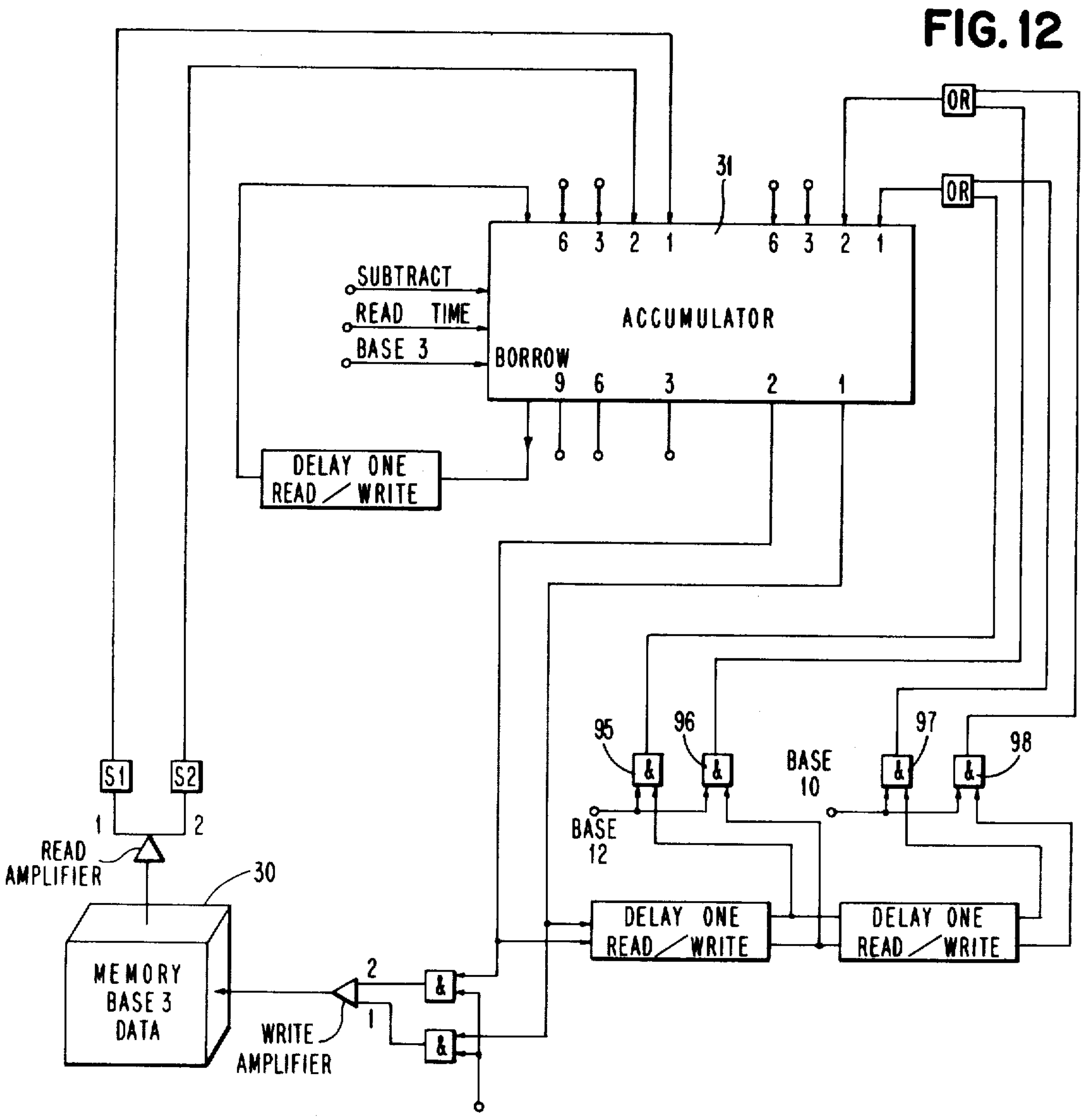

FIG. 12 shows circuits operable during the fourth cycle of conversion of base 3 data to base 10 or base 12 data.

Figure 13:
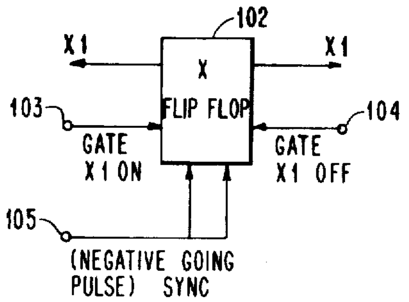
Figure 14:
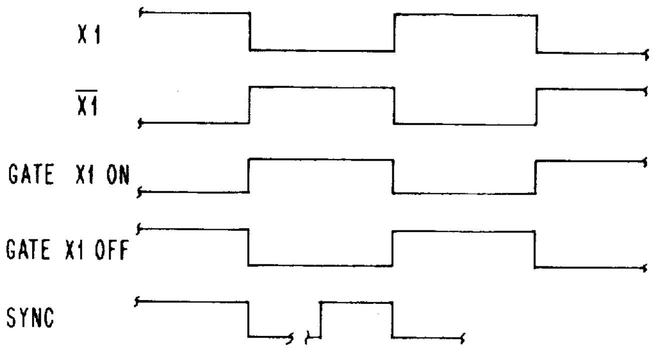

FIGS. 13–32 comprise various basic circuits and logic that are useful in the circuits of FIGS. 1–12, as follows:

FIG. 13 illustrates a basic flip-flop (trigger) circuit operable in a bistable manner as shown in FIG. 14.

Figure 15:
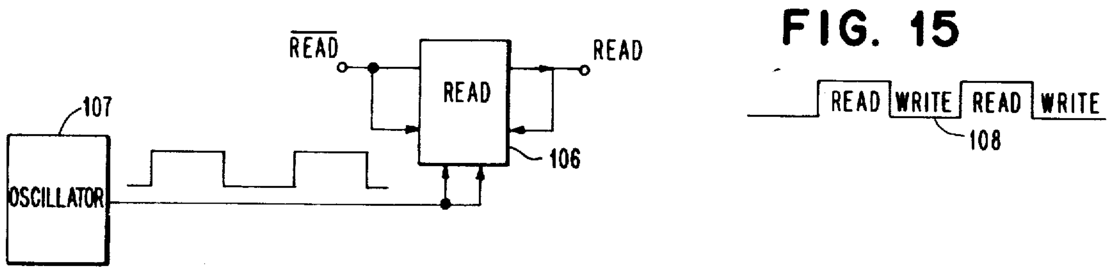

FIG. 15 shows a read-write trigger and related timing diagram.

Figure 16:
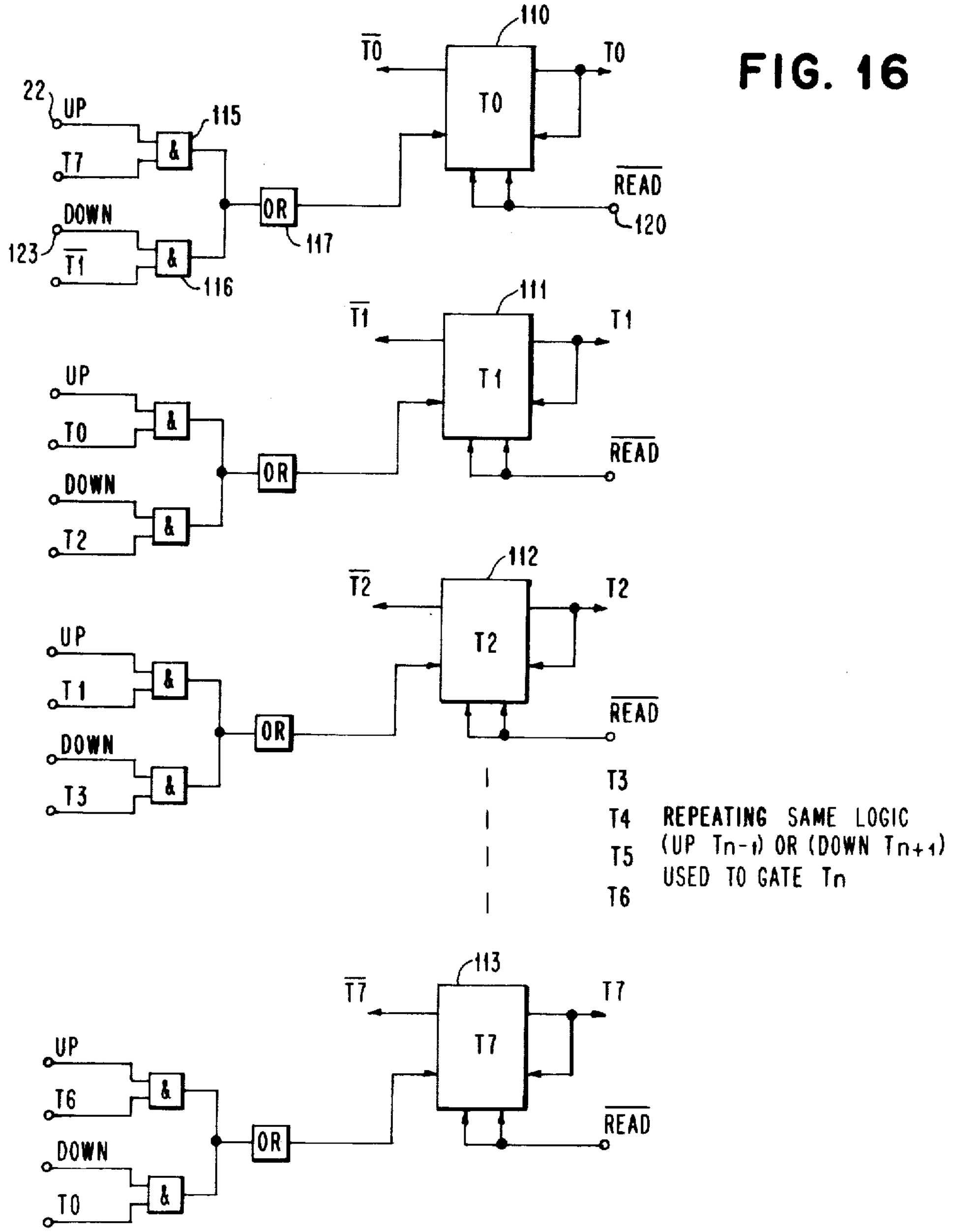
Figure 17:
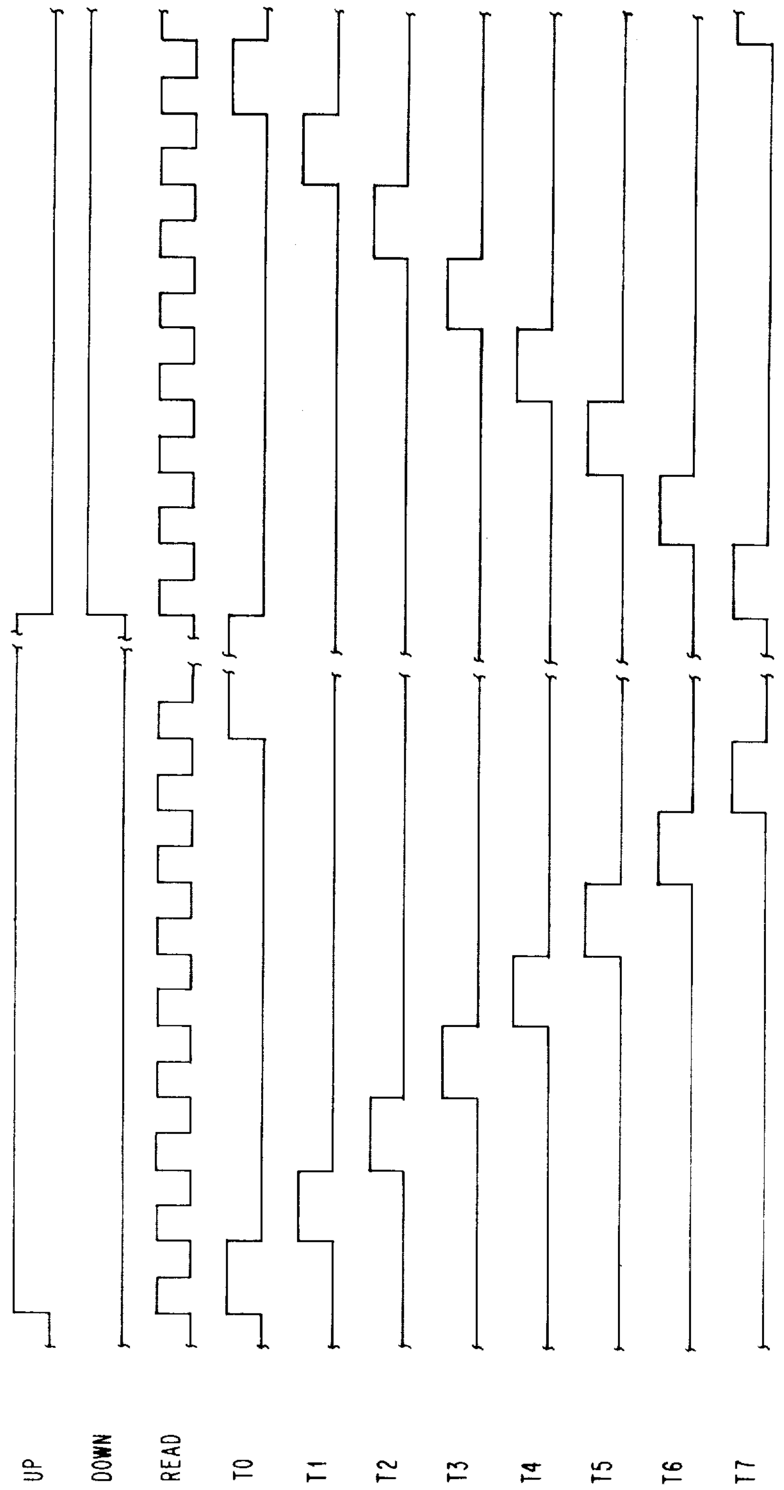

FIG. 16 illustrates an eight-stage clock with stages designated T0–T7 operable to count up or down as shown in FIG. 17.

Figure 19:
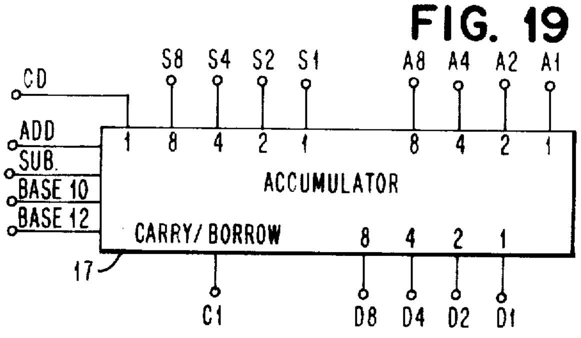
Figure 18:
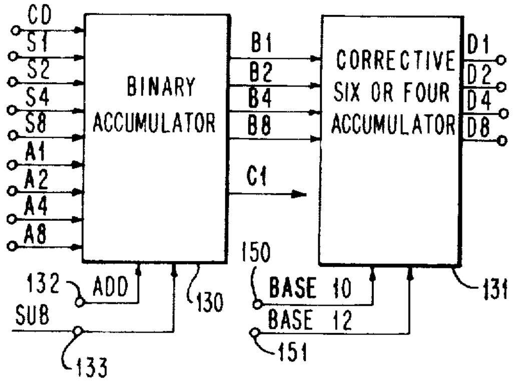

FIG. 18 is a somewhat more detailed version of FIG. 19 that shows an accumulator circuit for use in converting base 2 data to base 10 or base 12 data, comprising a binary accumulator portion and a corrective four or six portion.

Figures 20, 21:
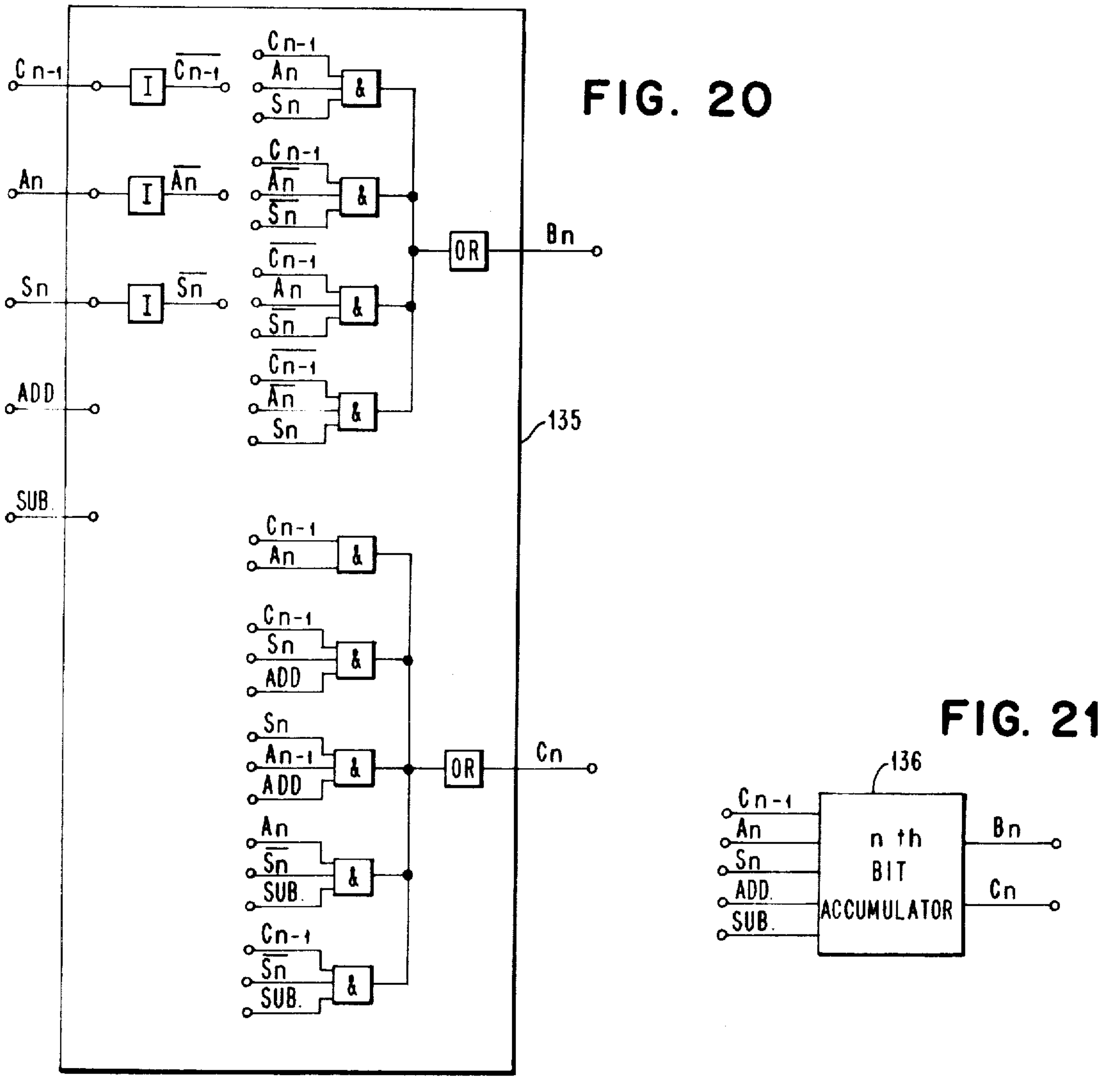

FIG. 20 is a detailed logic diagram of a typical "$n^{th}$" bit accumulator position, FIG. 21, for the accumulator circuit of FIGS. 18 and 19.

Figures 22, 23:
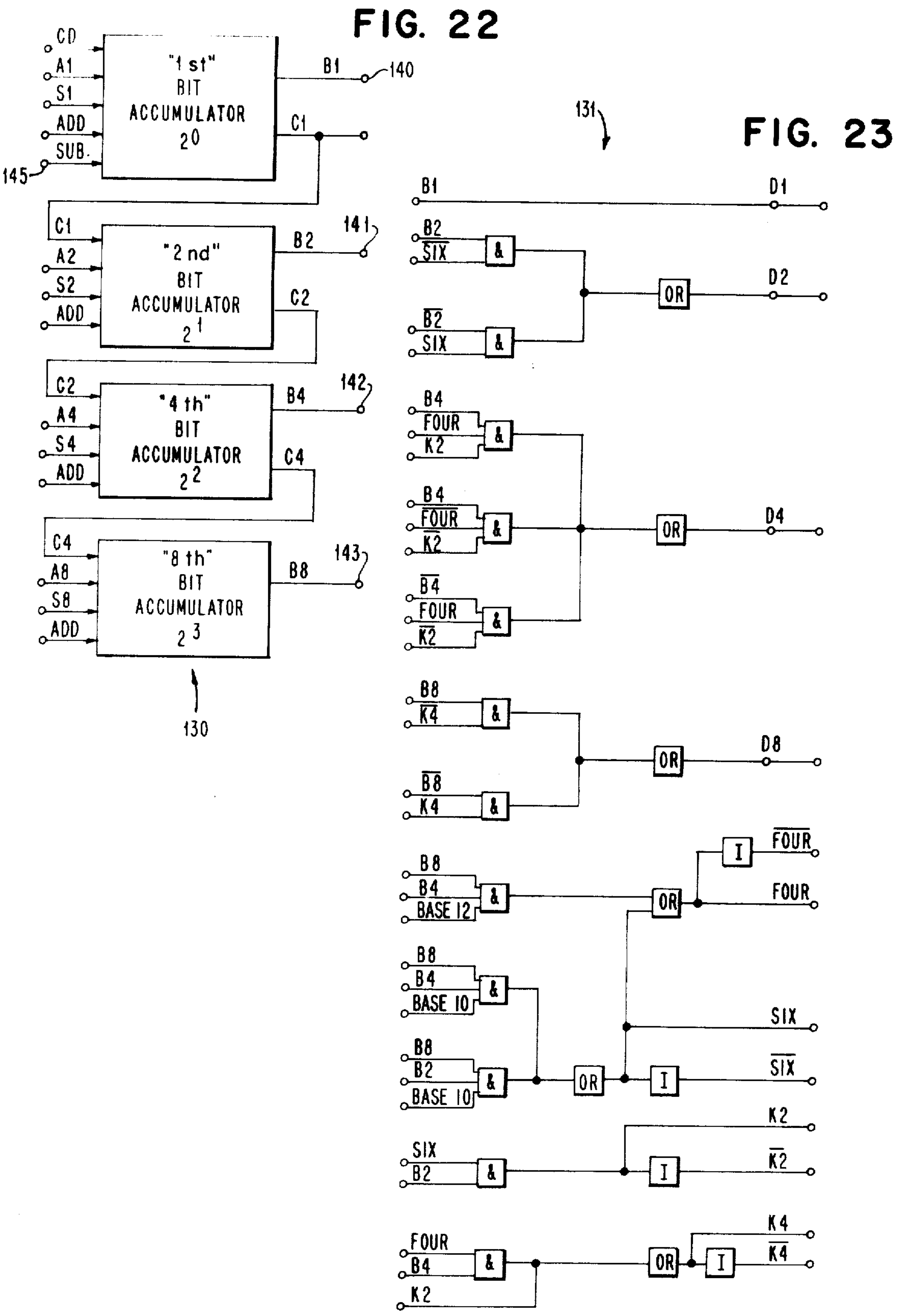

FIG. 22 further illustrates the binary accumulator portion of the accumulator circuit of FIGS. 18 and 19.

FIG. 23 depicts the detailed implementation of the corrective four or six portion of the accumulator circuit of FIGS. 18 and 19.

Figure 24:
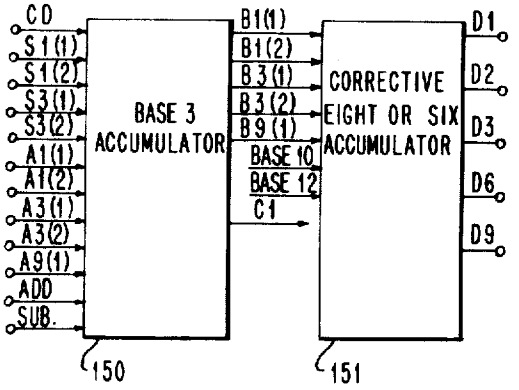
Figure 25:
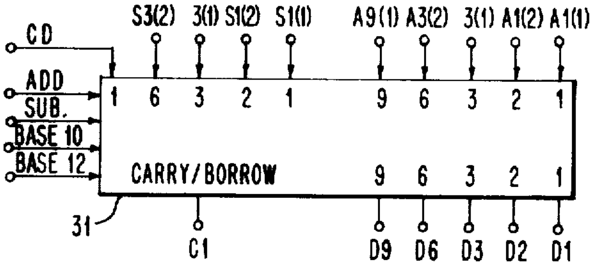

FIG. 24 is a more detailed version of FIG. 25 that shows an accumulator circuit for use in converting base 3 data to base 10 or base 12 data, comprising a base 3 accumulator portion and a corrective eight or six portion.

Figure 26:
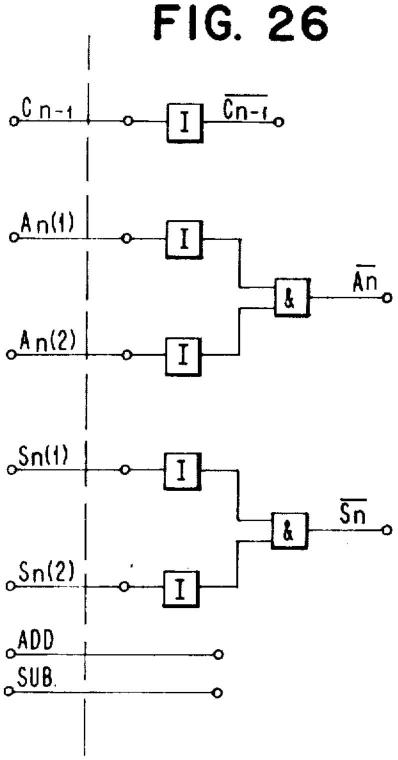
Figure 27:
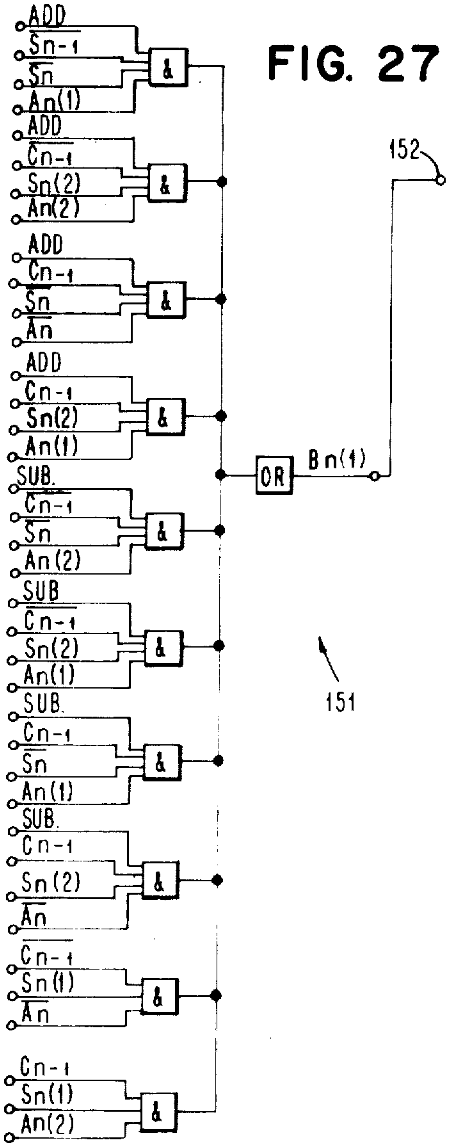
Figure 29:
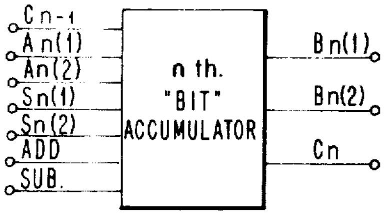
Figures 28, 30:
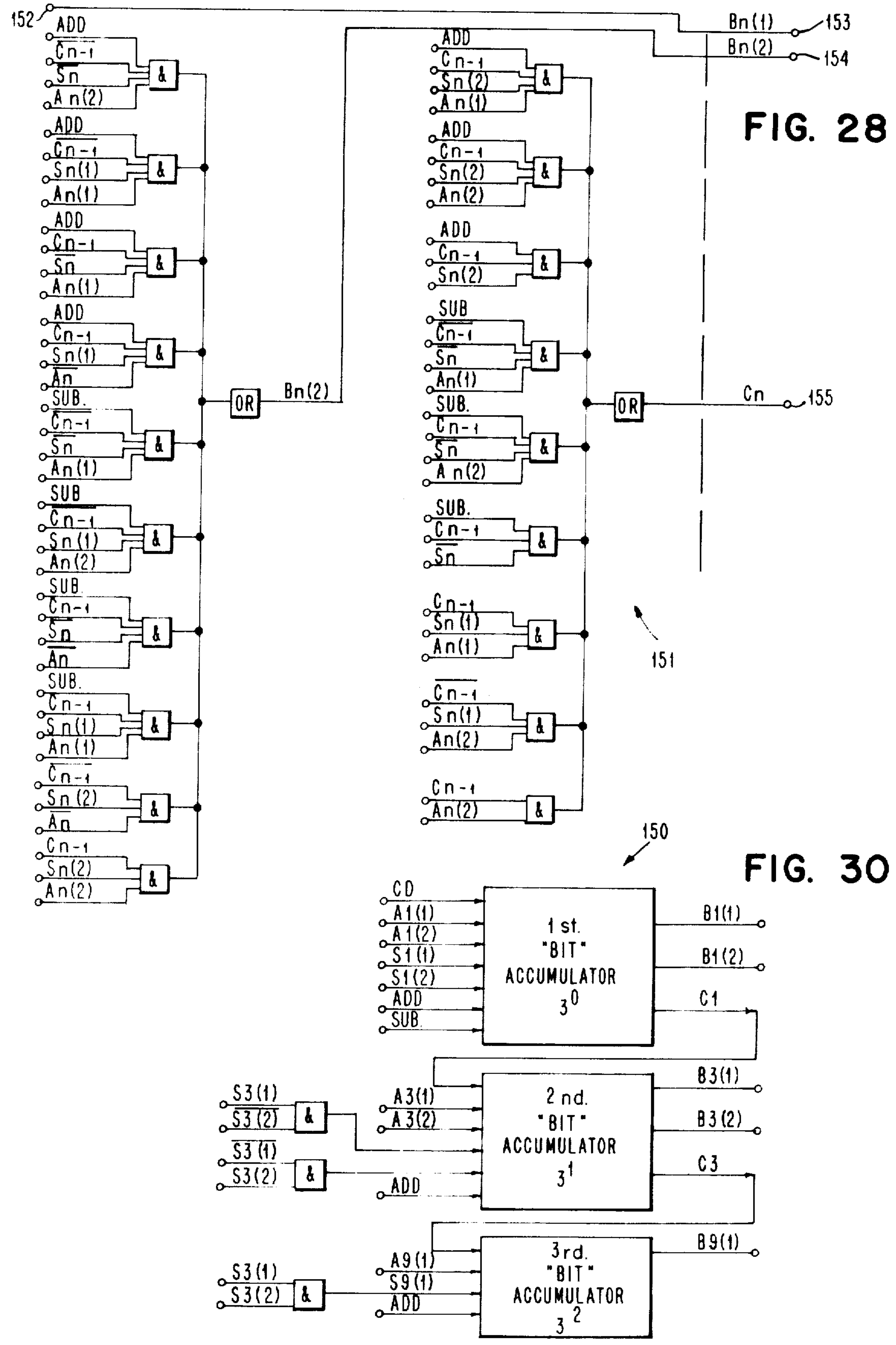

FIGS. 26, 27, and 28 are detailed logic diagrams of a typical "$n^{th}$" bit accumulator position, FIG. 29, for the accumulator circuit of FIGS. 24 and 25.

FIG. 30 further illustrates the base 3 accumulator portion of the accumulator circuit of FIGS. 24 and 25.

Figure 31:
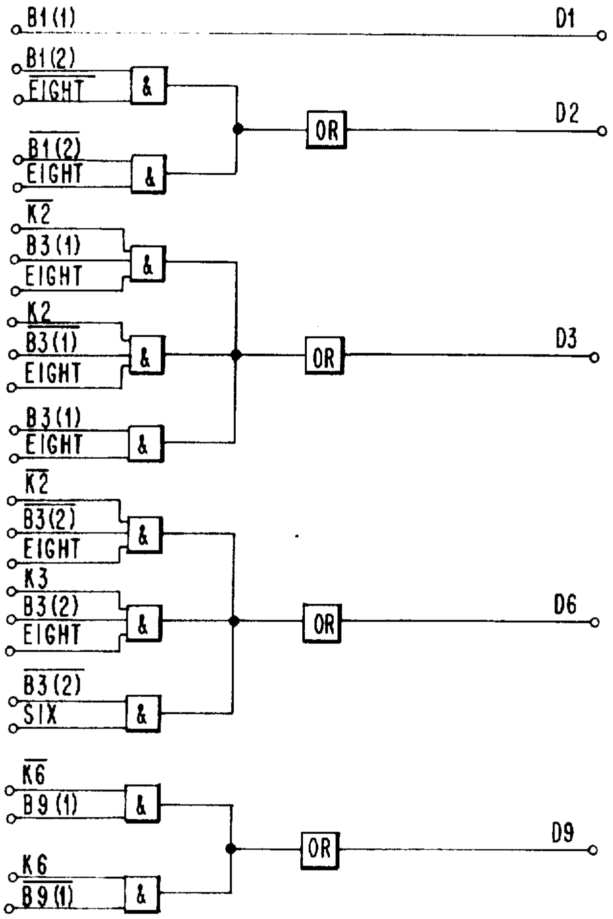
Figure 32:
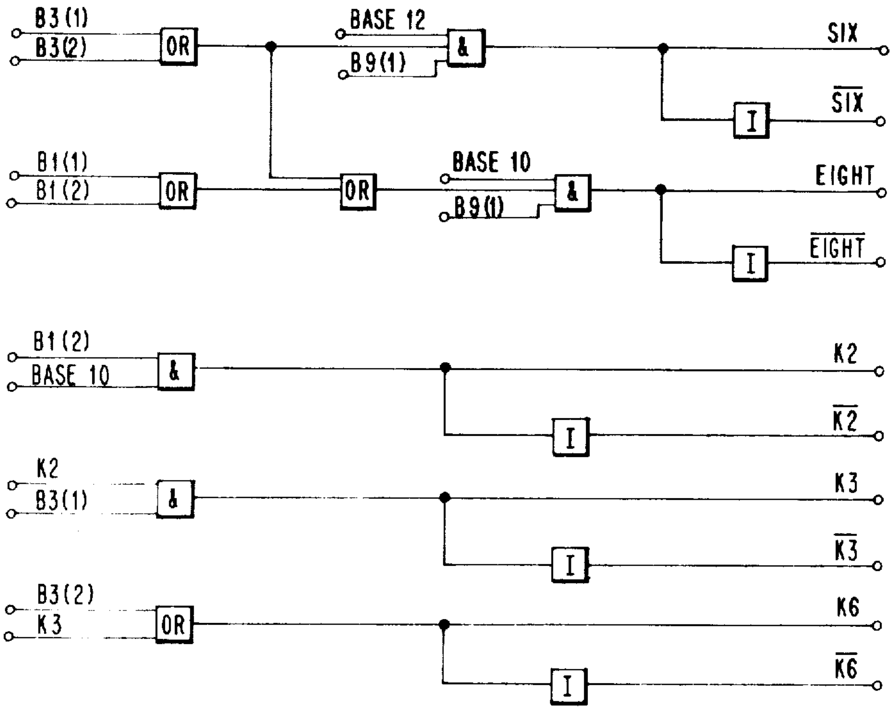

FIGS. 31 and 32 depict the detailed implementation of the corrective eight or six portion of the accumulator circuit of FIGS. 24 and 25.

ABBREVIATIONS AND SYMBOLS

An — "$n^{th}$" bit position, A latch
A latch — Temporary accumulator storage latch, A1, A2, A4, A8, etc.
Bn — "$n^{th}$" bit value, "$n^{th}$" bit position (base accumulator)
Base — Number base, base 10, base 2, etc.
C — Base of source (old radix) data
CD — Delayed Carry (or Borrow)
Cn — Carry (or Borrow), "$n^{th}$" bit position
Cn-1 — Carry or Borrow, $n$-1 bit position
D1, D2, etc. — Ultimate output of accumulator circuit after correction
Delay — Data ordinal delay
I — Invert circuit $m$ — Divisor or new radix
$n$ — Power to which base is raised
N — Number to be converted less remainder R (units digit)
N* — (N/Base)$n$
Or — Logical Or circuit
P — Positive integer
R — Read data cycle
S — Memory storage latch, S1, S2, S4, S8 bit times
Sn — "$n^{th}$" bit position, S inputs
S1 — S1 latch — stores 1 bit, Base 3
S2 — Sw latch — stores 2 bit, Base 3
$\overline{T0}$ — Logical Not T0
T0 — Time period 0
T1 — Time period 1
T2 — Time period 2
T3 — Time period 3
T4 — Time period 4
T5 — Time period 5
T6 — Time period 6
T7 — Time period 7
W — Write data cycle
$\epsilon$ — Logical And circuit

CLOCK, ACCUMULATOR, AND LOGIC CIRCUITS AND TIMING DIAGRAMS

Reference is made to later sections herein for a consideration of various basic clocking, accumulating and logic circuits and timing diagrams that are useful in the circuits of FIGS. 1–6 and FIGS. 7–12. These basic elements are particularly shown in FIGS. 13–32 and will not be reviewed at this point since they are discussed fully later in the case.

GENERAL PRINCIPLES OF CONVERSION

The conversion circuits of the present invention are predicated upon recognition of the fact that a number represented in a first radix can be converted readily to a number of second radices using common shared hardware if the following equation is satisfied:

$$m = C^n(PC+1)$$

$$m = C^nX$$

In the equation, $m$ represents the divisor, that is, the base or radix to which the existing data is to be converted. $C$ represents the radix or base of the original data. The factors $P$ and $n$ are positive integers used in the equation for convenience. If any set of values for $P$ and $n$ satisfy the equation for $m$ in the specified base $C$ of the dividend, then division by $m$ can be implemented. The determination that the equation is satisfied for any original source data is first made in order to develop the circuits appropriate for converting the source data to other radices. As an example, data represented in a base 4 can be converted to other radices, but only if the equation is satisfied. Representative radices to which numbers represented in base 4 can be converted, that is, $m$ divisors are shown in the following Table A:

TABLE A

Base 4 (O=4)

| n | P | m |
|---|---|---|
| 0 | 0 | 1 |
| 0 | 1 | 5 |
| 0 | 2 | 9 |
| 0 | 3 | 13 |
| 0 | 4 | 17 |
| 0 | 5 | 21 |
| 0 | 6 | 25 |
| 0 | 7 | 29 |
| 0 | 8 | 33 |
| . | . | . |
| 1 | 0 | 4 |
| 1 | 1 | 20 |
| 1 | 2 | 36 |
| 1 | 3 | 52 |
| 1 | 4 | 68 |
| 1 | 5 | 84 |
| 1 | 6 | 100 |
| 1 | 7 | 116 |
| 1 | 8 | 132 |
| . | . | . |
| 2 | 1 | 16 |
| 2 | 2 | 80 |
| 2 | 3 | 144 |
| 2 | 4 | 208 |
| . | . | . |
| ETC | | (Permissible divisors if dividend is expressed in Base 4) |

By reference to the table, it can be seen that numbers represented in base 4 can be converted to a radix 1 (same base), 5, 9, 13, etc.

As another example, data stored in base 10 can be converted to other radices as illustrated in the following Table B:

TABLE B

Base 10 (C=10)

| n | P | m |
|---|---|---|
| 0 | 0 | 1 |
| 0 | 1 | 11 |
| 0 | 2 | 21 |
| 0 | 3 | 31 |
| 0 | 4 | 41 |
| . | . | . |
| 1 | 0 | 10 |
| 1 | 1 | 110 |
| 1 | 2 | 210 |
| 1 | 3 | 310 |
| 1 | 4 | 410 |
| . | . | . |
| 2 | 0 | 100 |
| 2 | 1 | 1100 |
| 2 | 2 | 2100 |
| 2 | 3 | 3100 |
| 2 | 4 | 4100 |
| . | . | . |
| ETC | | (Permissible divisors if dividend is expressed in Base 10) |

When a determination has been made as to which divisors can be derived from the equation, conversion of the number in the original base to a new base involves the following procedures:

First Cycle 1. A remainder or units digit is accumulated in the new base by appropriate inspection of the dividend represented in the old base.

Second Cycle 2. The developed remainder is subtracted from the original dividend.

Third Cycle 3. A technique of fast division first involves shifting the result, and then Fourth Cycle 4. Development of a subtrahend for subtraction converts the data to proper weighted ordinal representations for use during a succeeding conversion sequence of four cycles.

The digit developed as the remainder or units digit during First Cycle 1. is stored or printed out, depending upon the radices involved.

The four general conversion cycles just given are repeated as many times as required to convert the original source data to the new radix, that is, until the source data is reduced to zero.

CONVERSION OF BASE 2 DATA TO BASE 10 OR BASE 12 DATA

Reference is made to FIGS. 1 through 6 for circuits required for conversion of numbers represented in binary base 2 (radix C) to base 10, decimal (radix *m*1) or base 12, duodecimal radix *m*2). For purposes of illustration, it is assumed that the numbers "255" is stored in binary form in memory 1, FIG. 1. The conversion steps applicable to conversion of base 2 data to base 10 or base 12 are set forth below as they apply specifically to conversion to base 10. The number 255 stored in binary is converted to decimal (base 10) form by the following steps:

| | | |
|---|---|---|
| 1. | First Conversion Step (four cycles of T0–T7 times) (Base 2 to Base 10) | |
| | Original number (N + R) | 255 |
| | Remainder R (Units Digit) | 5 |
| | New N | 250 |
| | After shifting and division (new N + R) | 25 |
| 2. | Second Conversion Step (four cycles of T0–T7 times) | |
| | Number (new N + R) | 25 |
| | Remainder R (Units Digit) | 5 |
| | New N | 20 |
| | After shifting and vision (new R) | 2 |
| 3. | Third Conversion Step | |
| | Final digit (R) (N + R has been reduced to zero) | 2 |

The conversion process from base 2 to base 10, as an example, involves the development of the units digit (R) in successive steps. In the first step, the units digit in decimal form is a "5". It is also a "5" in the second conversion step. Following the second conversion step, only the "2" of the original number 255 remains to be converted and no further conversion is required.

As illustrated in the aforementioned Goldsberry radix converter application, when a number is converted from one radix to another, the units digit required can be developed readily by accumulating equivalent values for the ordinal positions of the original source data according to a recognizable pattern. The following table illustrates this:

TABLE C

| Binary Bit (Radix C) | State | Base 10 Value (Radix $m1$) (100) | (10) | Units | Base 12 Value (Radix $m2$) (144) | (12) | Units |
|---|---|---|---|---|---|---|---|
| 1st | 1 | | | 1 | | | 1 |
| 2nd | 1 | | | 2 | | | 2 |
| 3rd | 0 | | | 4 | | | 4 |
| 4th | 1 | | | 8 | | | 8 |
| | | | | | Pattern Repeat | | |
| 5th 1 | 1 | | | 6 | | 1 | 4 |
| | | Pattern Repeat | | | | | |
| 6th | 1 | | 3 | 2 | | 2 | 8 |
| 7th | 0 | | 6 | 4 | | 5 | 4 |
| 8th | 0 | 1 | 2 | 8 | | (10) | 8 |
| 9th | 0 | 2 | 5 | 6 | | | |
| | | | | | 1 | 9 | 4 |
| | | | | | | | 8 |

(Relative values of binary bits expressed in base 10 and base 12 values. Example shows the number 59 stored in binary.)

Table C shows weighted equivalents for each ordinal position of a number in binary form for both a base 10 and a base 12 radix. By observing the repeating pattern 2, 4, 8, 6, 2, 4, 8, 6, etc., the circuits are developed to accumulate a units digit or remainder in a rapid and efficient manner. For this purpose, the corresponding weighted equivalents are accumulated with carries ignored. A final accumulated total, ignoring carries, will express the units digit in the new radix.

The principles are extended to the development of a units digit from binary base 2 data to base 12 radix with the repeating pattern 4, 8, 4, 8, 4, 8, etc.

Figures 1, 1A, 2:
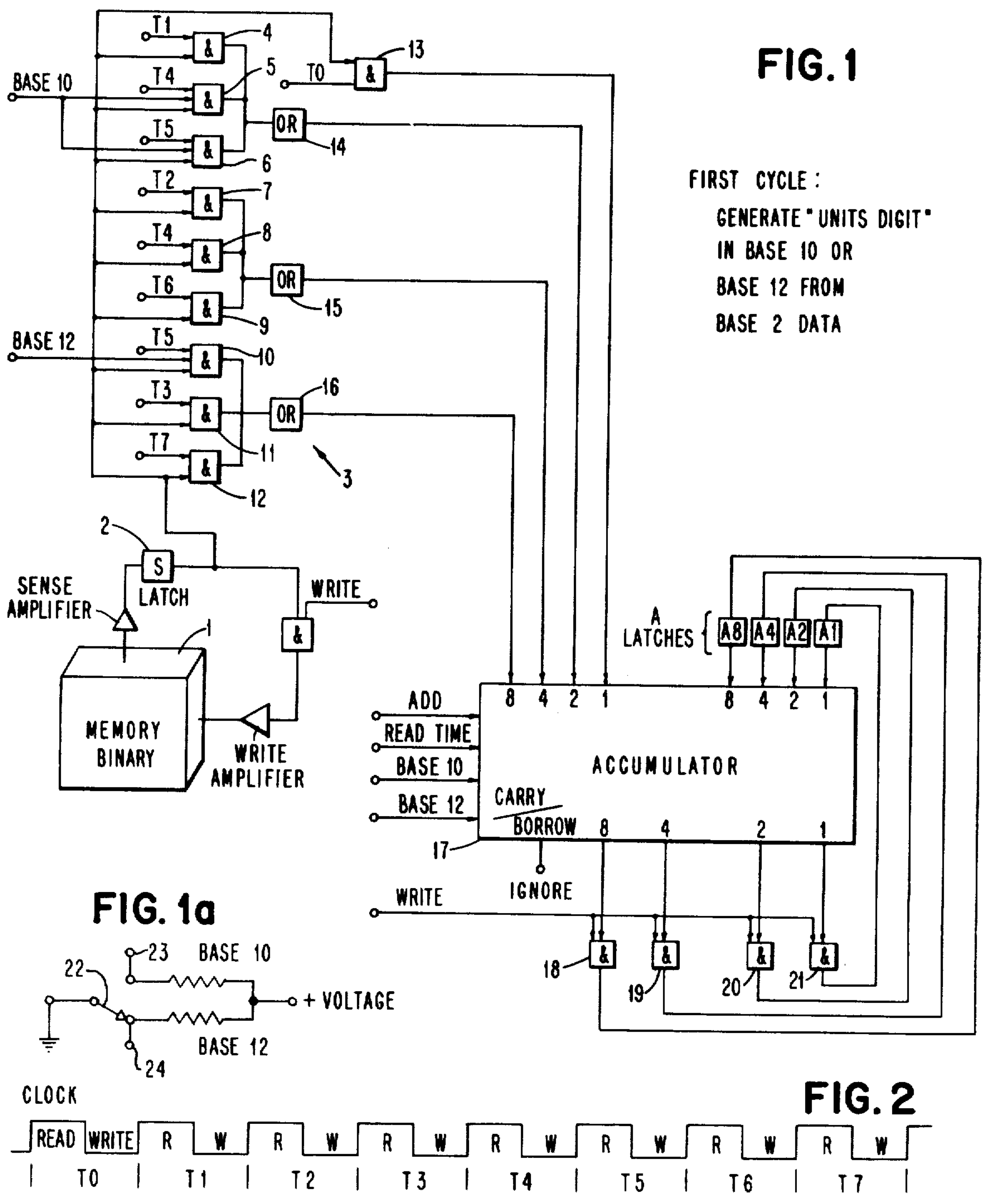

The circuit of FIG. 1 is useful for developing the units digit (R) in base 10 or base 12 from original source data (N + R) stored in base 2. The accumulator 17 has weighted ordinal positions 1–2–4–8 that can be used in common to represent binary data (base 2) as well as base 10 or 12 data to which conversion is being made.

CONVERSION OF BASE 2 DATA TO BASE 10

The circuits of FIGS. 1–6 are first described in connection with the conversion of base 2 data to base 10 by selection of the base 10 control lines. This conversion mode is established by disconnecting ground through switch 22, FIG. 1*a*, to condition the base 10 gating lines from terminal 23 in a logic system in which the "on" or "one" state is a positive (+) voltage. In the other mode, to be discussed later, switch 22 conditions the base 12 gating lines from terminal 24. The following Tables D, E, G and H illustrate the basic four cycles required for converting base 2 data to base 10. These four cycles are repeated until the original number has been reduced to zero. Table F illustrates a shifting process applicable to conversion of base 2 data to any radix 1–32, including base 10.

TABLE D

Base 2 (radix C) to Base 10 (radix ml.), Cycle 1—Determine units digit, Remainder (R)

| | Time | From memory S latch | To memory S latch | Accumulator input, 8-4-2-1 | Base 10 Accumulator output, C-8-4-2-1 | A register, 8-4-2-1 | A register count (units digit) |
|---|---|---|---|---|---|---|---|
| Clock T0: | | | | | | | |
| Bit $2^0$ | Read | 1 | | 1 | 0 0 0 0 1 | | |
| (1) | Write | | 1 | | | 0 0 0 1 | 1 |
| Clock T1: | | | | | | | |
| Bit $2^1$ | Read | 1 | | 2 | 0 0 0 1 1 | 0 0 0 1 | |
| (2) | Write | | 1 | | | 0 0 1 1 | 3 |
| Clock T2: | | | | | | | |
| Bit $2^2$ | Read | 1 | | 4 | 0 0 1 1 1 | 0 0 1 1 | |
| (4) | Write | | 1 | | | 0 1 1 1 | 7 |
| Clock T3: | | | | | | | |
| Bit $2^3$ | Read | 1 | | 8 | 1 0 1 0 1 | 0 1 1 1 | |
| (8) | Write | | 1 | | | 0 1 0 1 | 5 |
| Clock T4: | | | | | | | |
| Bit $2^4$ | Read | 1 | | 4-2 | 1 0 0 0 1 | 0 1 0 1 | |
| (16) | Write | | 1 | | | 0 0 0 1 | 1 |
| Clock T5: | | | | | | | |
| Bit $2^5$ | Read | 1 | | 2 | 0 0 0 1 1 | 0 0 0 1 | |
| (32) | Write | | 1 | | | 0 0 1 1 | 3 |
| Clock T6: | | | | | | | |
| Bit $2^6$ | Read | 1 | | 4 | 0 0 1 1 1 | 0 0 1 1 | |
| (64) | Write | | 1 | | | 0 1 1 1 | 7 |
| Clock T7: | | | | | | | |
| Bit $2^7$ | Read | 1 | | 8 | 1 0 1 0 1 | 0 1 1 1 | |
| (128) | Write | | 1 | | | 0 1 0 1 | 5 |
| Original Number-Base 2 Expressed in Base 10 (N + R) 255 | | | | | | | |
| Units Digit (R) Base 10: | | | | | | | 5 |

In Table D, the development of the units digit "5" from the original number "255" is shown. The original number 255, represented by a "1" bit in each bit position $2^0$ through $2^7$, is read from memory 1, FIG. 1, on a serial-by-bit basis, during the clock times T0 through T7, FIG. 2. Table D shows the bits that are read from memory to an S latch 2. Bits stored in S latch 2 are gated through various AND and OR circuits indicated at 3 at appropriate times under control of gating lines T0 through T7, so designated. As an example, AND circuit 13 is gated at T0 time, AND circuit 4 at T1 time, etc. The circuits include AND circuits 4–13, and OR circuits 14–16. AND circuits 5 and 6 are gated only for a conversion from base 2 to base 10. AND circuit 10 is gated only for a conversion from base 2 to base 12. The other AND circuits are gated in common whether the conversion is from base 2 to base 10 or from base 2 to base 12.

With the gating arrangement shown in FIG. 1, the inputs 8, 4, 2 and 1 of the accumulator 17 are gated as necessary by OR circuits 14–16 and AND circuit 13 in accordance with the teachings of the aforementioned Goldsberry application Ser. No. 56,099, entitled "Radix Converter", to accumulate the weighted equivalents for the new base in order to develop the units digit. Outputs from accumulator 17 are written at "Write" time in each bit interval T0–T7 through gates 18–21 to four temporary storage latches designated A8, A4, A2 and A1. The values stored in the A latches are brought in to associated inputs of accumulator 17 and taken into account at "Read" time during successive clock times T0 through T7 for accumulating the units digit.

Cycle 2 of the conversion procedure is illustrated in the following table:

TABLE E

Base 2 to Base 10, Cycle 2.—Subtract units digit (R) from N+R

| Time | | From memory S latch | To memory accl. output | Accumulator input, 8-4-2-1 | Base 10 Accumulator output, C-8-4-2-1 | A register, 8-4-2-1 | A register count (units digit) |
|---|---|---|---|---|---|---|---|
| T0: $2^0$ | Read | 1 | | 0 0 0 1 | 0 0 0 0 0 | 0 1 0 1 | |
| | Write | | 0 | | | ↑ | 5 |
| T1: $2^1$ | Read | 1 | | 0 0 0 1 | 0 0 0 0 1 | 0 1 0 1 | |
| | Write | | 1 | | | ↑ | 5 |
| T2: $2^2$ | Read | 1 | | 0 0 0 1 | 0 0 0 0 0 | 0 1 0 1 | |
| | Write | | 0 | | | ↑ | 5 |
| T3: $2^3$ | Read | 1 | | 0 0 0 1 | 0 0 0 0 1 | 0 1 0 1 | |
| | Write | | 1 | | | ↑ | 5 |
| T4: $2^4$ | Read | 1 | | 0 0 0 1 | 0 0 0 0 1 | | |
| | Write | | 1 | | | | |
| T5: $2^5$ | Read | 1 | | 0 0 0 1 | 0 0 0 0 1 | | |
| | Write | | 1 | | | | |
| T6: $2^6$ | Read | 1 | | 0 0 0 1 | 0 0 0 0 1 | | |
| | Write | | 1 | | | | |
| T7: $2^7$ | Read | 1 | | 0 0 0 1 | 0 0 0 0 1 | | |
| | Write | | 1 | | | | |
| Original Number N + R | | 255 | | | | | |
| Less Remainder R | | 5 | | | | | |
| N | | 250 | | | | | |

Figure 3:
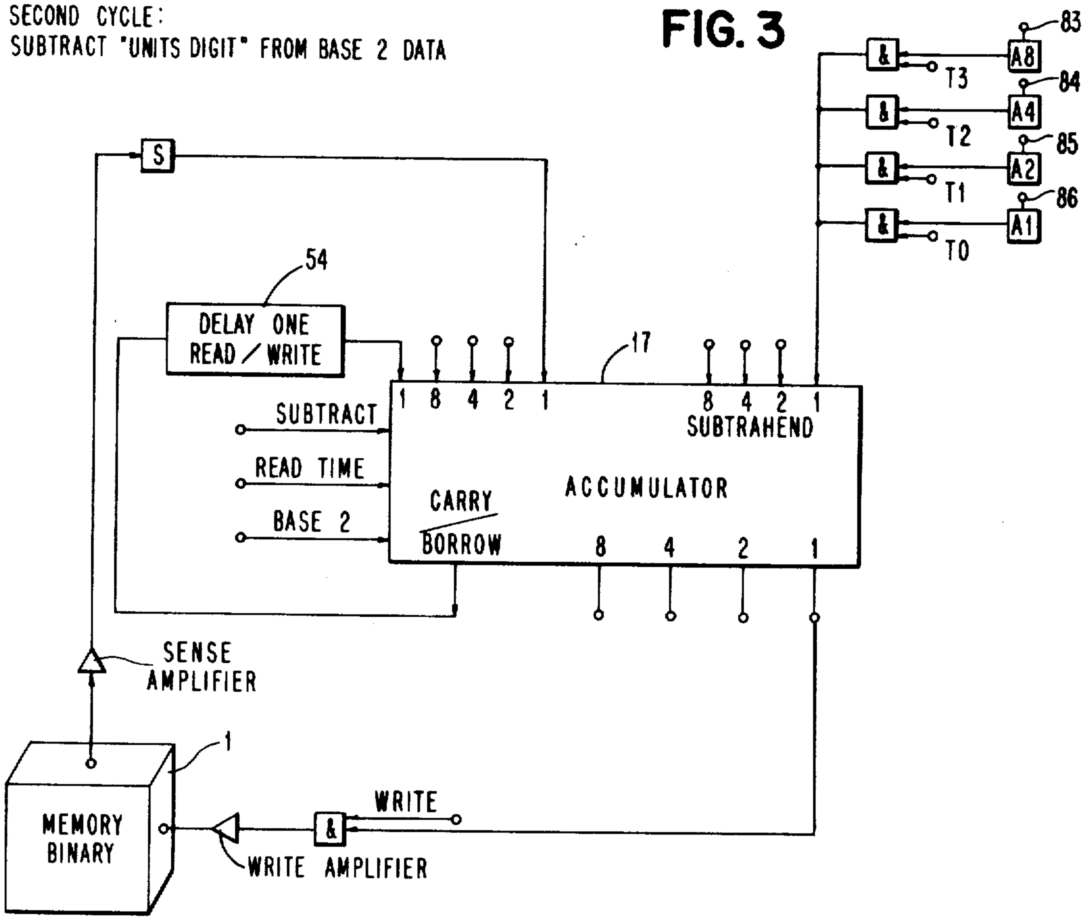

During the second cycle, the units digit previously developed is subtracted from the original base 2 data. The circuit for performing the subtraction is shown in FIG. 3 and includes memory 1, as well as accumulator 17, with an additional circuit for delaying a carry or borrow output from accumulator 17 for one cycle designated 54. The units digit (R) bit representations stored in the A latches are gated at times To, T1, T2, and T3 to the accumulator as the corresponding bits of the original base 2 data (N + R) are read from memory to develop the number N. This is accomplished as illustrated in Table E, by examining the number 0101, during times T0–T1. At time T0 the least significant bit position of 0101 is examined and as shown in the table, since there is a binary 1 in this position the output from the accumulator is a 0. At time T, the next highest position is examined and since a 0 is in this position the 1 in the second bit position of the word (decimal 255, binary 11111111) is not changed. This sequence is continued until all bit positions of the remainder 0101 have been examined. Thus, the binary word 11111010 is (decimal 250) is input to the memory 1.

The subtraction of the units digit (R) from the original number (N + R) results in a dividend that is an integer multiple of the divisor, in this case 10, to which the number is being converted.

The units digit is supplied to a utilization device, such as a memory or printer from leads 83–86, FIG. 3.

Figure 4:
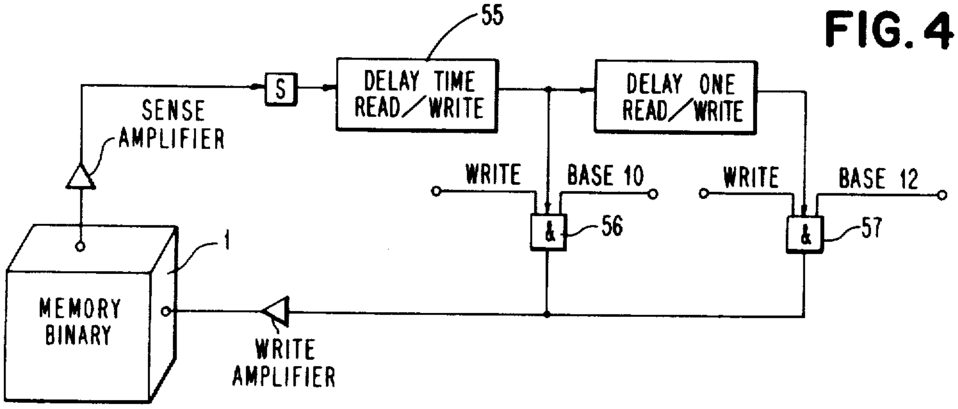
Figure 5:
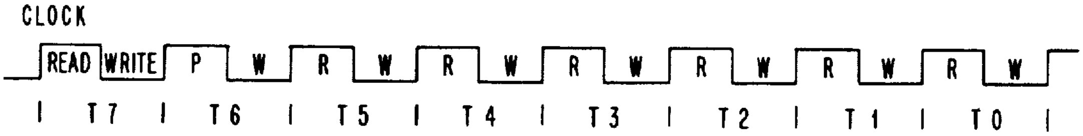
Figure 6:
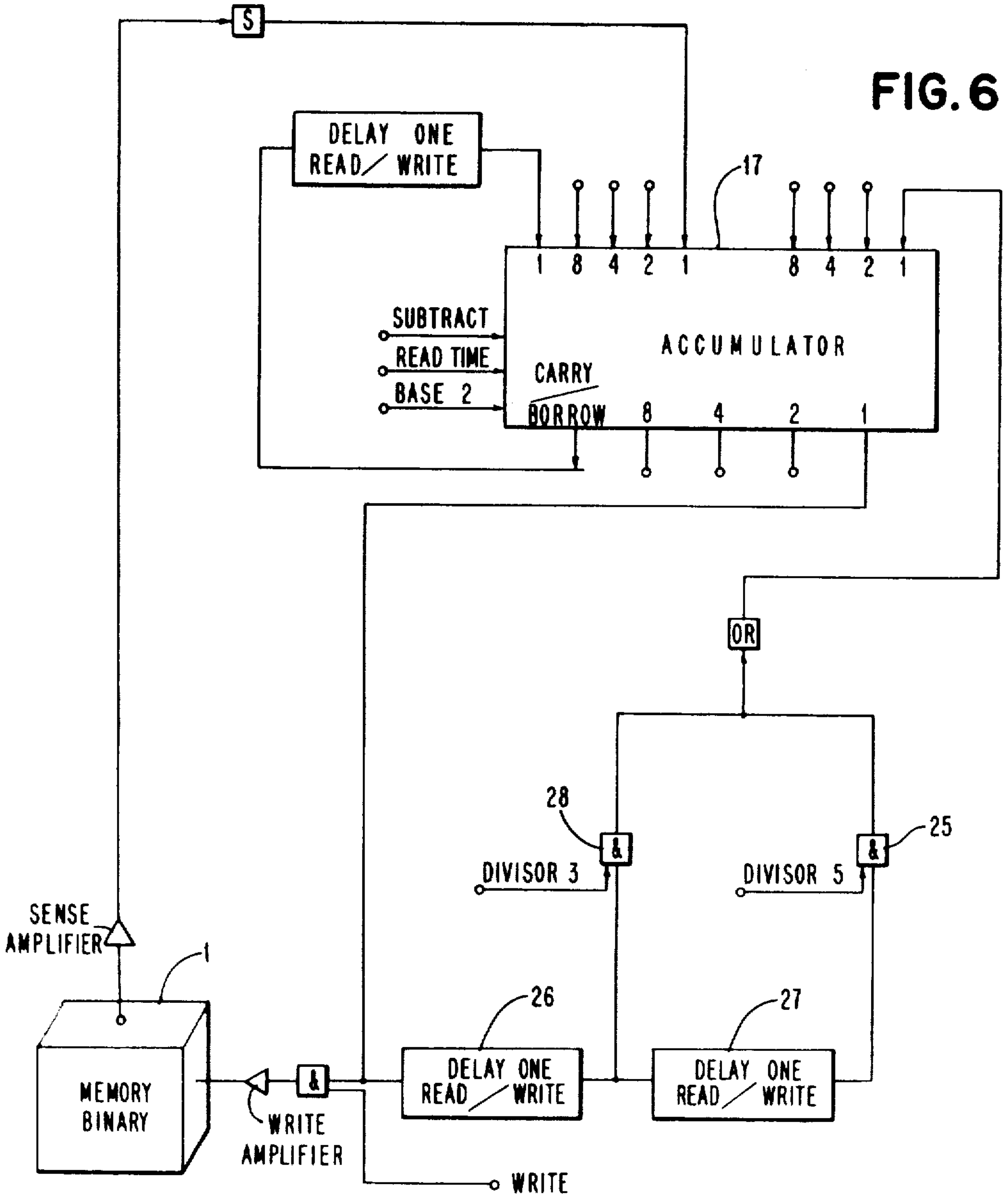

FIGS. 4, 5, and 6 illustrate the division procedure. The division involves some combination of shifting and/or subtraction of a developed subtrahend.

This scheme is essentially dependent upon the knowledge that the dividend is an integer multiple of the divisor. The following equation gives the subtrahend that is generated to perform division using subtraction in a serial machine:

To divide $N$ by $m$ the following relation exists.

$$N-(m-1)(N/m)=N/m$$

The equation states that the desired answer can be obtained if $(m-1)$ times the answer can be obtained. (For simplicity m should be treated as a positive integer with sign control handled separately.) It appears that the answer needs to be known before the correct subtrahend can be generated. This is only partly true. In a serial machine, subtraction is performed low order bits first to properly handle borrows. Therefore, if $(m-1)$ times the answer is generated with a method that uses only delayed terms then the one bit of the subtrahend is always known to be zero allowing generation of the one bit of the answer. Once this bit has been generated it is available for the proper delay or delays needed to generate the subtrahend. With the sequence started it can propagate to the end of the word.

The requirement that multiplication by $(m-1)$ can be performed using only delayed terms involves varying degrees of difficulty as $m$ becomes large. The first observation that aids in the division is to remove the highest power of two that might be a factor of $m$ by a simple binary right shift of the proper number of positions. This means that if $m=(2^n)\,X$, then $N$ is shifted $n$ positions and $X$ is treated as a new m to complete the division. In the case where $X$ equals "1" the right shift is all that is required.

The following table illustrates the subtrahend equations and shifting required for conversion of base 2 data to any one of a number of other bases 1 through 32.

TABLE F

| m | Shift Right n Positions | X | Subtrahend Equation | |
|---|---|---|---|---|
| 1 | 0 | | 0 | |
| 2 | 1 | 1 | 0 | |
| 3 | 0 | | A1 | Answer delayed 1 bit |
| 4 | 2 | 1 | 0 | |
| 5 | 0 | | A2 | Answer delayed 2 bits |
| 6 | 1 | 3 | A1 | Answer delayed 1 bit |
| 7 | 0 | | A2 + A1 | Sum of Ans. Del. 2 + Ans. Del. 1 |
| 8 | 3 | 1 | 0 | |
| 9 | 0 | | A3 | Answer delayed 3 bits |
| 10 | 1 | 5 | A2 | |
| 11 | 0 | | A3 + A1 | ETC. |
| 12 | 2 | 3 | A1 | |
| 13 | 0 | | A3 + A2 | |
| 14 | 1 | 7 | A2 + A1 | |
| 15 | 0 | | A3 + A2 + A1 | |
| 16 | 4 | 1 | 0 | |
| 17 | 0 | | A4 | |
| 18 | 1 | 9 | A3 | |
| 19 | 0 | | A4 + A1 | |
| 20 | 2 | 5 | A2 | |
| 21 | 0 | | A4 + A2 | |
| 22 | 1 | 11 | A3 + A1 | |
| 23 | 0 | | A4 + A2 + A1 | |
| 24 | 3 | 3 | A1 | |
| 25 | 0 | | A4 + A3 | |
| 26 | 1 | 13 | A3 + A2 | |
| 27 | 0 | | A4 + A3 + A1 | |
| 28 | 2 | 7 | A2 + A1 | |
| 29 | 0 | | A4 + A3 + A2 | |
| 30 | 1 | 15 | A3 + A2 + A1 | |
| 31 | | | A4 + A3 + A2 + A1 | |
| 32 | 5 | 1 | 0 | |

(Examples of shift positions and subtrahend equation that can be used to implement division by *m*.)

The shift operation can either precede or follow the division by X operation.

In accordance with the foregoing principles, the third cycle for converting the original number "255" following the subtraction of the units digit "5" involves a shift right one position as illustrated in the following table:

TABLE G

Base 2 to Base 10, Cycle 3, shift right *n* positions.

For Base 2 to Base 10, shift right 1 position.

$$m = 2^n X \overset{\downarrow}{2^1} . 5$$

| Clock | Time | | From Memory S Latch | To Memory Acc 1 Output |
|---|---|---|---|---|
| T7 | $2^7$ | Read | 1 | |
| | | Write | | 0 |
| T6 | $2^6$ | Read | 1 | |
| | | Write | | 1 |
| T5 | $2^5$ | Read | 1 | |
| | | Write | | 1 |
| T4 | $2^4$ | Read | 1 | |
| | | Write | | 1 |
| T3 | $2^3$ | Read | 1 | |
| | | Write | | 1 |
| T2 | $2^2$ | Read | 0 | |
| | | Write | | 1 |
| T1 | $2^1$ | Read | 1 | |
| | | Write | | 0 |
| T0 | $2^0$ | Read | 0 | |
| | | Write | | 1 |
| Shift N right *n* positions | | | | |
| Result N* | | | | 125 |

The shifting required is accomplished by the delay circuit 55 shown in FIG. 4, with And circuit 56 gated for the base 2 to base 10 operation. During the shifting of the data from memory, the clock times are reversed from T7 through To as shown in FIG. 5.

Following the shifting operation, the data is then divided by the developed subtrahend X as illustrated in the following table.

TABLE H

Base 2 to Base 10, Cycle 4—Divide by X for Base 2, $X=5$, $m=2^n X = \overset{\downarrow}{2^1} \cdot 5$.

| Time | | From memory S latch | To memory S latch | Memory to accumulator, 8-4-2-1 | Delay to accumulator, 8-4-2-1 | Base 10 accumulator output, B-8-4-2-1 |
|---|---|---|---|---|---|---|
| Clock T0: $2^0$ | Read | 1 | | 1 | 0 | 1 |
| | Write | | 1 | | | |
| Clock T1: $2^1$ | Read | 0 | | 0 | 0 | 0 |
| | Write | | 0 | | | |
| Clock T2: $2^2$ | Read | 1 | | 1 | 1 | 0 |
| | Write | | 0 | | | |
| Clock T3: $2^3$ | Read | 1 | | 1 | 0 | 1 |
| | Write | | 1 | | | |
| Clock T4: $2^4$ | Read | 1 | | 1 | 0 | 1 |
| | Write | | 1 | | | |
| Clock T5: $2^5$ | Read | 1 | | 1 | 1 | 0 |
| | Write | | 0 | | | |
| Clock T6: $2^6$ | Read | 1 | | 1 | 1 | 0 |
| | Write | | 0 | | | |
| Clock T7: $2^7$ | Read | 0 | | 0 | 0 | 0 |
| | Write | | 0 | | | |

Stored in Memory
Beginning of 4th Cycle N*=125
Stored in Memory
End of 4th Cycle 25

Result: Memory
Base 10: 25

FIG. 6 shows the circuits involved including memory 1 and accumulator 17. This phase of the conversion operation is essentially a division of the number N*. In the conversion of base 2 data to base 10, AND circuit 25, FIG. 6, is gated and cooperates with delay circuits 26 and 27 to develop the subtrahend required in Table H.

At the end of the four cycles given in Tables D, E, G and H, Memory will be storing the number "25" in binary form in readiness for another sequence of four cycles as shown in FIGS. 1 through 6, just discussed.

CONVERSION OF BASE 2 DATA TO BASE 12

The circuits of FIG. 1 through FIG. 6 lend themselves readily to converting base 2 data to base 12, by appropriate gating of the base 12 control lines. In FIG. 1a, switch 22 is moved to provide ground to terminal 23 to condition the base 12 gating lines from terminal 24 rather than conditioning the base 10 gating lines from terminal 23. The following Tables, I, J, K and L illustrate the four cycles required for converting the base 2 data stored in memory 1, FIG. 1, to base 12. As previously indicated, these cycles are repeated during successive conversion steps until the original number is reduced to zero.

TABLE I

Base 2 (radix C) to Base 12 (radix m2), Cycle 1—Determine units digit, Remainder (R)

| | Time | From memory S latch | To memory S latch | Accumulator input, 8-4-2-1 | Base 12 accumulator output, C-8-4-2-1 | A register, 8-4-2-1 | A register count, units digit |
|---|---|---|---|---|---|---|---|
| Clock T0: | | | | | | | |
| Bit $2^0$... | Read. | 1 | | 1 | 0 0 0 0 1 | | |
| (1)...... | Write. | | 1 | | | 0 0 0 1 | 1 |
| Clock T1: | | | | | | | |
| Bit $2^1$... | Read. | 1 | | 2 | 0 0 0 1 1 | | |
| (2)...... | Write. | | 1 | | | 0 0 1 1 | 3 |
| Clock T2: | | | | | | | |
| Bit $2^2$... | Read. | 1 | | 4 | 0 0 1 1 1 | | |
| (4)...... | Write. | | 1 | | | 0 1 1 1 | 7 |
| Clock T3: | | | | | | | |
| Bit $2^3$... | Read. | 1 | | 8 | 1 0 0 1 1 | | |
| (8)...... | Write. | | 1 | | | 0 0 1 1 | 3 |
| Clock T4: | | | | | | | |
| Bit $2^4$... | Read. | 1 | | 4 | 0 0 1 1 1 | | |
| (16)..... | Write. | | 1 | | | 0 1 1 1 | 7 |
| Clock T5: | | | | | | | |
| Bit $2^5$... | Read. | 1 | | 8 | 1 0 0 1 1 | | |
| (32)..... | Write. | | 1 | | | 0 0 1 1 | 3 |
| Clock T6: | | | | | | | |
| Bit $2^6$... | Read. | 1 | | 4 | 0 0 1 1 1 | | |
| (64)..... | Write. | | 1 | | | 0 1 1 1 | 7 |
| Clock T7: | | | | | | | |
| Bit $2^7$... | Read. | 1 | | 8 | 1 0 0 1 1 | | |
| (128).... | Write. | | 1 | | | 0 0 1 1 | 3 |
| Original Number: (N+R) | | 255 | | | | | |
| Units digit (R), Base 12: | | | | | | | 3 |

TABLE J

*Base 2 to Base 12, Cycle 2*—Subtract units digit (R)

| | Time | From memory S latch | To memory acc. 1 output | Accumulator input, 8-4-2-1 | Base 12 accumulator output, C-8-4-2-1 | A register, 8-4-2-1 | A register count, Units Digit |
|---|---|---|---|---|---|---|---|
| Clock T0: | | | | | | | |
| $2^0$.......... | {Read.... {Write.... | 1 | 0 | 0 0 0 1 | 0 0 0 0 0 | 0 0 1 1 ↑ | 3 |
| Clock T1: | | | | | | | |
| $2^1$.......... | {Read.... {Write.... | 1 | 0 | 0 0 0 1 | 0 0 0 0 0 | 0 0 1 1 ↑ | 3 |
| Clock T2: | | | | | | | |
| $2^2$.......... | {Read.... {Write.... | 1 | 1 | 0 0 0 1 | 0 0 0 0 1 | | |
| Clock T3: | | | | | | | |
| $2^3$.......... | {Read.... {Write.... | 1 | 1 | 0 0 0 1 | 0 0 0 0 1 | | |
| Clock T4: | | | | | | | |
| $2^4$.......... | {Read.... {Write.... | 1 | 1 | 0 0 0 1 | 0 0 0 0 1 | | |
| Clock T5: | | | | | | | |
| $2^5$.......... | {Read.... {Write.... | 1 | 1 | 0 0 0 1 | 0 0 0 0 1 | | |
| Clock T6: | | | | | | | |
| $2^6$.......... | {Read.... {Write.... | 1 | 1 | 0 0 0 1 | 0 0 0 0 1 | | |
| Clock T7: | | | | | | | |
| $2^7$.......... | {Read.... {Write.... | 1 | 1 | 0 0 0 1 | 0 0 0 0 1 | | |

Original Number (N + R):..............255
Less remainder (R)........................3
N..........................................252

TABLE K

Base 2 to Base 12, Cycle 3-Shift Right *n* Positions

For Base 2 to Base 12, Shift Right 2 Positions $$m = 2^n X = 2^2 \cdot 3$$

| Clock | Time | | From Memory S Latch | (Right Shift 2) To Memory Acc 1 Output |
|---|---|---|---|---|
| T7 | $2^7$ | R | 1 | |
| | | W | | 0 |
| T6 | $2^6$ | R | 1 | |
| | | W | | 0 |
| T5 | $2^5$ | R | 1 | |
| | | W | | 1 |
| T4 | $2^4$ | R | 1 | |
| | | W | | 1 |
| T3 | $2^3$ | R | 1 | |
| | | W | | 1 |
| T2 | $2^2$ | R | 1 | |
| | | W | | 1 |
| T1 | $2^1$ | R | 0 | |
| | | W | | 1 |
| T0 | 2 | R | 0 | |
| | | W | | 1 |
| | N = 252 | | | |
| Shift Result | 252/4 = N* = 63 | | | |

TABLE L

Base 2 to Base 12, Cycle 4—Divide By X for Base 2 to Base 12, X=3; $m=2^n X=2^2.3$

| | Time | | From memory S latch | To memory acc. 1 bit | Memory to accumulator, 8-4-2-1 | Delay to accumulator, 8-4-2-1 | Accumulator output, B-8-4-2-1 |
|---|---|---|---|---|---|---|---|
| Clock T0: | $2^0$ | R | 1 | | 1 | 0 | 1 |
| | | W | | 1 | | | |
| Clock T1: | $2^1$ | R | 1 | | 1 | 1 | 0 |
| | | W | | 0 | | | |
| Clock T2: | $2^2$ | R | 1 | | 1 | 0 | 1 |
| | | W | | 1 | | | |
| Clock T3: | $2^3$ | R | 1 | | 1 | 1 | 0 |
| | | W | | 0 | | | |
| Clock T4: | $2^4$ | R | 1 | | 1 | 0 | 1 |
| | | W | | 1 | | | |
| Clock T5: | $2^5$ | R | 1 | | 1 | 1 | 0 |
| | | W | | 0 | | | |
| Clock T6: | $2^6$ | R | 0 | | 0 | 0 | 0 |
| | | W | | 0 | | | |
| Clock T7: | $2^7$ | R | 0 | | 0 | 0 | 0 |
| | | W | | 0 | | | |
| Stored In Memory Beginning 4th Cycle, | | | ↑ N*=63 | ↑ | | | |
| Stored In Memory End of 4th Cycle | | | | 21 | | | |
| Result: Memory Base 12: | | | | 21 | | | |

During the first cycle, Table 1, the units digit, which in this case is "3", is developed using accumulator 17, FIG. 1.

During the second cycle, the units digit "3" is subtracted from the original number "255" using the circuit in FIG. 3. This is shown in Table J. Tables K and L illustrate the procedure required for deriving a new number for storage in memory 1 by shifting the number N right two positions under control of And circuit 57, FIG. 4, and a division by 3 under control of And circuit 28, FIG. 6. The result in memory will be a "21" stored in a base 2 with the remainder 3 developed during the first cycle illustrated in Table I. The clock times T0–T7, FIG. 2, are used during this procedure for all cycles except Cycle 3 when the clock is reversed to T7–TO, as shown in FIG. 5.

CONVERSION OF BASE 3 DATA TO BASE 10 OR BASE 12

Figures 7, 7A, 8:
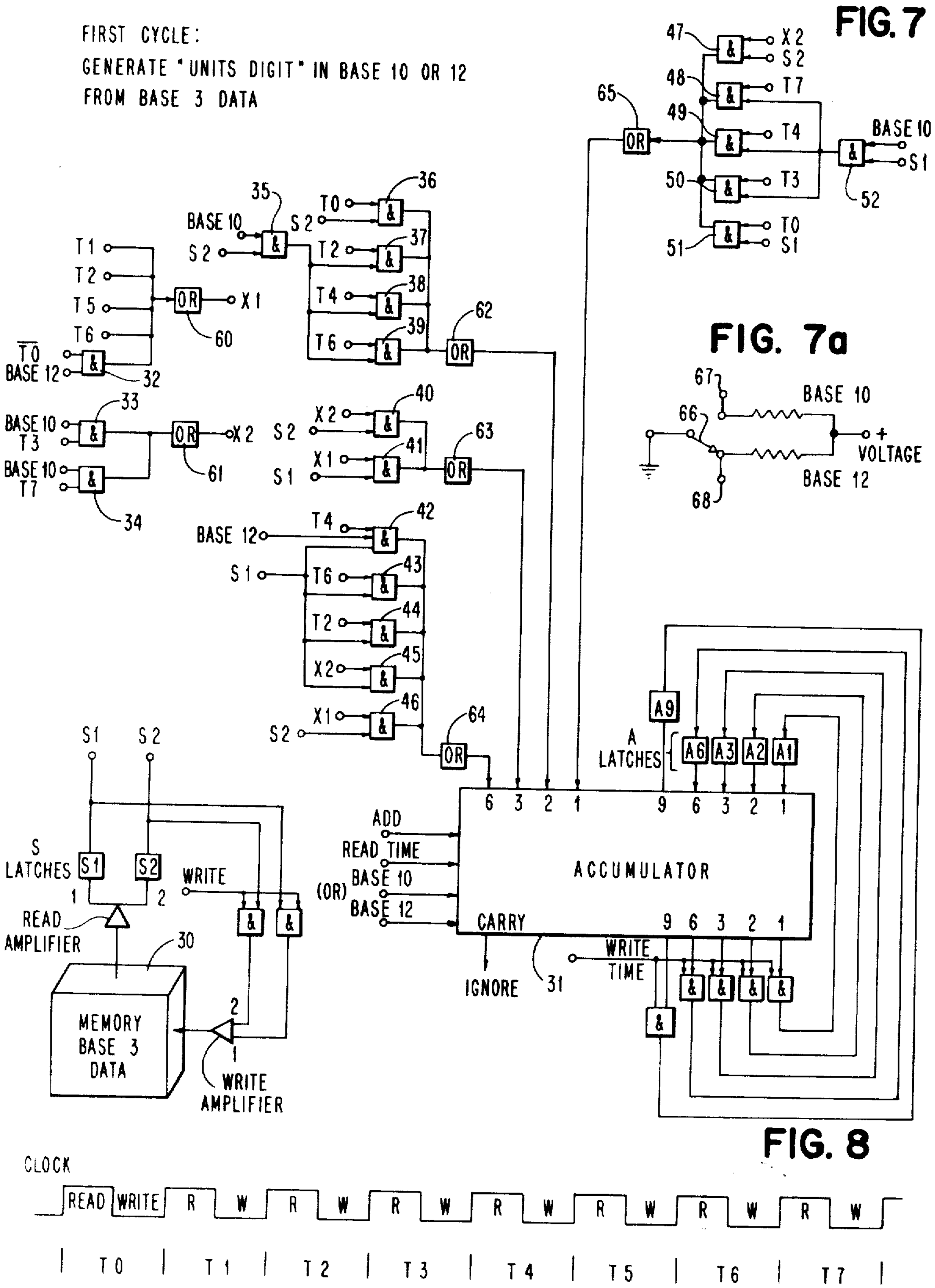
FIG. 8 represents clock times for operation of the circuit in FIG. 7 as well as the circuit in FIG. 9.

In order to further illustrate the advantages of the present invention, a second embodiment is disclosed in FIGS. 7 through 12 for converting original source data stored in base 3 to base 10 or base 12, as desired. In FIG. 7*a*, switch 66 is positioned the appropriate direction to condition the base 10 gating lines from terminal 67 or the base 12 gating lines from terminal 68, as selected. FIG. 7 shows a memory 30 for storing base 3 data. The memory has associated S latches designated S1 and S2 that provide base 3 ordinal representations during each of the successive clock times T0 through T7, FIG. 8. A base 3 representation may take any of the forms 0, 1, or 2 during each successive ordinal period. If the base 3 data representation is "0", neither of the S latches S1 or S2 will have information stored in it. A "1" representation is indicated by the S1 latch. A "2" representation is indicated by the S2 latch. The circuit of FIG. 7 includes an accumulator 31 with associated A latches designated A1, A2, A3, A6, and A9. Input gating networks include a number of And circuits designated 32–52 and Or circuits designated 60–65. The outputs of the gating networks are used for developing the units digit in base 10 or base 12, as selected. Units digit circuits that apply to both base 10 and base 12 are in some cases combined with X1 and X2 outputs to further gate selected And circuits such as And circuits 40, 41, 45, and 46. Base 10 and base 12 gating is provided to permit conversion of base 3 data to either one of the desired radices.

Prior to the development of the circuits shown in FIGS. 7–12, the equation previously given is tested in order to determine that base 3 (radix C) data can properly be converted to base 10 (radix *m2*) or base 12 (radix *m1*) data. The following indicates that such conversion is proper:

$$m = C^n(PC+1)$$

$$m = C^n X$$

$$m = 3^n(3P+1)$$

A divisor m can be used if there exists integers *n* and *P* that satisfy this equation.

For example, division by 12 or 10 is allowable.

$$(m1)\ 12 = 3^1(3\cdot 1+1) = 3\,(4) = 12$$

$$(m2)\ 10 = 3^0(3\cdot 1+1) = 1\,(10) = 10$$

The following table illustrates the radices to which base 3 data can be converted using the equation previously given:

TABLE M $m=3^n(3P+1)=3^nX$

| n | P | m allowable divisors | $(N/m)=(N/3^nX)=(N^*/X)$ Shift right n positions $N^*=(N/3^n)$ | X | Generate $(N^*/X)=N^*-(X-1)(N^*/X)$ Subtrahend Equation |
|---|---|---|---|---|---|
| 0 | 0 | 1 | 0 | 1 | 0 |
| 0 | 1 | 4 | 0 | 4 | Delay 1 |
| 0 | 2 | 7 | 0 | 7 | Delay 1+Delay 1 |
| 0 | 3 | 10 ← | 0 | 10 | Delay 2 |
| 0 | 4 | 13 | 0 | 13 | Delay 1+Delay 2 |
| . | . | . | . | . | etc. |
| 1 | 0 | 3 | 1 | 1 | 0 |
| 1 | 1 | 12 ← | 1 | 4 | Delay 1 |
| 1 | 2 | 21 | 1 | 7 | Delay 1+Delay 1 |
| 1 | 3 | 30 | 1 | 10 | Delay 2 |
| 1 | 4 | 39 | 1 | 13 | Delay 1+Delay 2 |
| . | . | . | . | . | etc. |
| 2 | 0 | 9 | 2 | 1 | 0 |
| 2 | 1 | 36 | 2 | 4 | Delay 1 |
| 2 | 2 | 63 | 2 | 7 | Delay 1+Delay 1 |
| 2 | 3 | 90 | 2 | 10 | Delay 2 |
| 2 | 4 | 117 | 2 | 13 | Delay 1+Delay 2 |
| . | . | . | . | . | etc. |

By reference to Table M, it is seen that a divisor m of 10 or 12, among others, is proper.

Accumulator 31, FIG. 7, is chosen with weighted accumulating positions designated 6, 3, 2, and 1 that can be used for representing both base 3 data as well as base 10 or base 12 data to which conversion is desired. The accumulator representations and decimal equivalents are shown in the following table:

TABLE N

Accumulator Coding

| Number | Bits 9 6 3 2 1 |
|---|---|
| 0 | 0 0 0 0 0 |
| 1 | 0 0 0 0 1 |
| 2 | 0 0 0 1 0 |
| 3 | 0 0 1 0 0 |
| 4 | 0 0 1 0 1 |
| 5 | 0 0 1 1 0 |
| 6 | 0 1 0 0 0 |
| 7 | 0 1 0 0 1 |
| 8 | 0 1 0 1 0 |
| 9 | 1 0 0 0 0 |
| 10 | 1 0 0 0 1 |
| 11 | 1 0 0 1 0 |

CONVERSION OF BASE 3 DATA TO BASE 12

The procedure for converting base 3 data to base 12 by the units digits, shifting, and divide by subtraction procedures illustrated in FIGS. 7 through 12 is shown in the following tables, P, Q, R, and S.

TABLE P

Base 3 (radix C) to Base 12 (radix ml.)

First cycle: Generate "units digit" for m=12 by adding

| Time Clock | Time Digit | Read/Write (R/W) | $S_2$ | $S_1$ | Accumulator input, 6 3 2 1 | Accumulator output, 9 6 3 2 1 | A Latches "units digit", 9 6 3 2 1 |
|---|---|---|---|---|---|---|---|
| T0 | $3^0$ | R<br>W | 2 | 0 | 0 0 2 0 | 0 0 0 2 0 ↘ | 0 0 0 0 0<br>0 0 0 2 0 |
| T1 | $3^1$ | R<br>W | 0 | 0 | 0 0 0 0 | 0 0 0 2 0 ↘ | 0 0 0 2 0<br>0 0 0 2 0 |
| T2 | $3^2$ | R<br>W | 2 | 0 | 6 0 0 0 | 0 6 0 2 0 ↘ | 0 0 0 2 0<br>0 6 0 2 0 |
| T3 | $3^3$ | R<br>W | 0 | 0 | 0 0 0 0 | 0 6 0 2 0 ↘ | 0 6 0 2 0<br>0 6 0 2 0 |
| T4 | $3^4$ | R<br>W | 0 | 1 | 6 3 0 0 | 0 0 3 2 0 ↘ | 0 6 0 2 0<br>0 0 3 2 0 |
| T5 | $3^5$ | R<br>W | 0 | 0 | 0 0 0 0 | 0 0 3 2 0 ↘ | 0 0 3 2 0<br>0 0 3 2 0 |
| T6 | $3^6$ | R<br>W | 0 | 0 | 0 0 0 0 | 0 0 3 2 0 ↘ | 0 0 3 2 0<br>0 0 3 2 0 |
| T7 | $3^7$ | R<br>W | 0 | 0 | 0 0 0 0 | 0 0 3 2 0 ↘ | 0 0 3 2 0<br>0 0 3 2 0 |

Write Back To Storage From This Data

Divide the Number 101 by 12=8, Remainder=5

101, Base 10=00010202, Base 3

N+R=N+R

TABLE Q

Base 3 to Base 12

Second Cycle: Subtract "Units Digit" From Base 3 Data.

| TIME Clock | TIME Digit | Read/Write (R/W) | $S_2$ | $S_1$ | Accumulator Input Borrow | Accumulator Input 6 3 2 1 | Accumulator Output Borrow | Accumulator Output 6 3 2 1 | Accumulator Input From A Latches (Loaded First Cycle) 6 3 2 1 |
|---|---|---|---|---|---|---|---|---|---|
| T0 | $3^0$ | R<br>W | 2 | 0 | 0 | 2 0 | 0 | 0 0 | 2 0 |
| T1 | $3^1$ | R<br>W | 0 | 0 | 0 | 0 0 | B | 2 0 | 0 3 |
| T2 | $3^2$ | R<br>W | 2 | 0 | B | 2 0 | 0 | 0 1 | |
| T3 | $3^3$ | R<br>W | 0 | 0 | 0 | 0 0 | 0 | 0 0 | |
| T4 | $3^4$ | R<br>W | 0 | 1 | 0 | 0 1 | 0 | 0 1 | |
| T5 | $3^5$ | R<br>W | 0 | 0 | 0 | 0 0 | 0 | 0 0 | |
| T6 | $3^6$ | R<br>W | 0 | 0 | 0 | 0 0 | 0 | 0 0 | |
| T7 | $3^7$ | R<br>W | 0 | 0 | 0 | 0 0 | 0 | 0 0 | |

Write Back to Storage From This Data

101 − 5 = 96, Base 10

(N+R)−R=0 0 0 1 0 1 2 0 , Base 3

TABLE R

Base 3 to Base 12

Third Cycle: Shift Right One Digit Position for $m=12=3^1(4)$

| TIME Clock | TIME Digit | Read/Write (R/W) | $S_2$ | $S_3$ | Write Back To Storage Delay One R/W 2 | 1 |
|---|---|---|---|---|---|---|
| T7 | $3^7$ | R<br>W | 0 | 0 ↘ | 0 | 0 |
| T6 | $3^6$ | R<br>W | 0 | 0 ↘ | 0 | 0 |
| T5 | $3^5$ | R<br>W | 0 | 0 ↘ | 0 | 0 |
| T4 | $3^4$ | R<br>W | 0 | 1 ↘ | 0 | 0 |
| T3 | $3^3$ | R<br>W | 0 | 0 ↘ | 0 | 1 |
| T2 | $3^2$ | R<br>W | 0 | 1 ↘ | 0 | 0 |
| T1 | $3^1$ | R<br>W | 2 | 0 ↘ | 0 | 1 |
| T0 | $3^0$ | R<br>W | 0 | 0 | 2 | 0 |

Result = N*

TABLE S

Base 3 to Base 12

Fourth Cycle: Divide N* by X, X=4 $m=3^1$ $X=3^1(4)$

| TIME Clock | TIME Digit | Read/ Write (R/W) | $S_2$ | $S_1$ | Accumulator Input Borrow | Accumulator Input 2 1 | Accumulator Output Borrow | Accumulator Output 2 1 | Delayed Accumulator Input (Subtrahend) 2 1 |
|---|---|---|---|---|---|---|---|---|---|
| T0 | $3^0$ | R<br>W | 2 | 0 | 0 | 2 0 | 0 | 2 0 | 0 0 |
| T1 | $3^1$ | R<br>W | 0 | 1 | | 0 1 | B | 2 0 | 2 0 |
| T2 | $3^2$ | R<br>W | 0 | 0 | B | 0 0 | B | 0 0 | 2 0 |
| T3 | $3^3$ | R<br>W | 0 | 1 | B | 0 1 | 0 | 0 0 | 0 0 |
| T4 | $3^4$ | R<br>W | 0 | 0 | 0 | 0 0 | 0 | 0 0 | 0 0 |
| T5 | $3^5$ | R<br>W | 0 | 0 | 0 | 0 0 | 0 | 0 0 | 0 0 |
| T6 | $3^6$ | R<br>W | 0 | 0 | 0 | 0 0 | 0 | 0 0 | 0 0 |
| T7 | $3^7$ | R<br>W | 0 | 0 | 0 | 0 0 | 0 | 0 0 | 0 0 |

Write Back to Storage From This Data
Result=0 0 0 0 0 0 2 2, Base 3
(=8, Base 10)

During the first cycle, the units digit in base 12 is developed with the circuits previously discussed in FIG. 7 and with the clock times shown in FIG. 8. The development of the units digit is based upon the recognition of the repeating pattern situation as shown in the following table T.

TABLE T

| Base 3 (Radix C) | | Value in Base 10 (Radix $m2$) $10^3$ | $10^2$ | $(10^1)$ | Units | Value in Base 12 (Radix $m1$) $12^3$ | $12^2$ | $12^1$ | Units |
|---|---|---|---|---|---|---|---|---|---|
| $(3^0)$ 1st digit | 0 | | | | 0 | | | | 0 |
| | 1 | | | | 1 | | | | 1 |
| | 2 | | | | 2 | | | | 2 |
| $(3^1)$ 2nd digit | 0 | | | | 0 | | | | 0 |
| | 1 | | | | 3 | | | | 3 |
| | 2 | | | | 6 | | | | 6 |
| $(3^2)$ 3rd digit | 0 | | | | 0 | | | | 0 |
| | 1 | | | | 9 | | | | 9 |
| | 2 | | | 1 | 8 | | | 1 | 6 |
| $(3^3)$ 4th digit | 0 | | | | 0 | | | | 0 |
| | 1 | | | 2 | 7 | | | 2 | 3 |
| | 2 | | | 5 | 4 | | | 4 | 6 |
| $(3^4)$ 5th digit | 0 | | | | 0 | | | | 0 |
| | 1 | | | 8 | 1 | | | 6 | 9 |
| | 2 | | 1 | 6 | 2 | | 1 | 1 | 6 |
| $(3^5)$ 6th digit | 0 | | | | 0 | | | | 0 |
| | 1 | | 2 | 4 | 3 | | 1 | 8 | 3 |
| | 2 | | 4 | 8 | 6 | | 3 | 4 | 6 |
| $(3^6)$ 7th digit | 0 | | | | 0 | | | | 0 |
| | 1 | | 7 | 2 | 9 | | 5 | 0 | 9 |
| | 2 | 1 | 4 | 5 | 8 | | (10) | 1 | 6 |
| $(3^7)$ 8th digit | 0 | | | | 0 | | | | 0 |
| | 1 | 2 | 1 | 8 | 7 | 1 | 3 | 2 | 3 |
| | 2 | 4 | 3 | 7 | 4 | 2 | 6 | 4 | 6 |

Repeating Pattern (base 10 units) — Repeating Pattern (base 12 units)

When a conversion is required from base 3 data to base 10, the repeating pattern becomes 0, 1, 2, 0, 3, 6, 0, 9, 8, 0, 7, and 4 as shown in Table T. In the present instance, where a conversion from base 3 data to base 12 is under way, the repeating pattern is 0, 3, 6, 0, 9, and 6 as shown in Table T. Accordingly, during the successive times T0–T7 when the units digit is developed, the weighted representations for base 12 are applied to the 6, 3, 2, and 1 inputs of accumulator 31 in order to develop the final units digit which is "5" as shown in Table P. This is represented by appropriate bit representations in the A latches with A3 and A2 being in the On state, combining to total "5".

Figure 9:
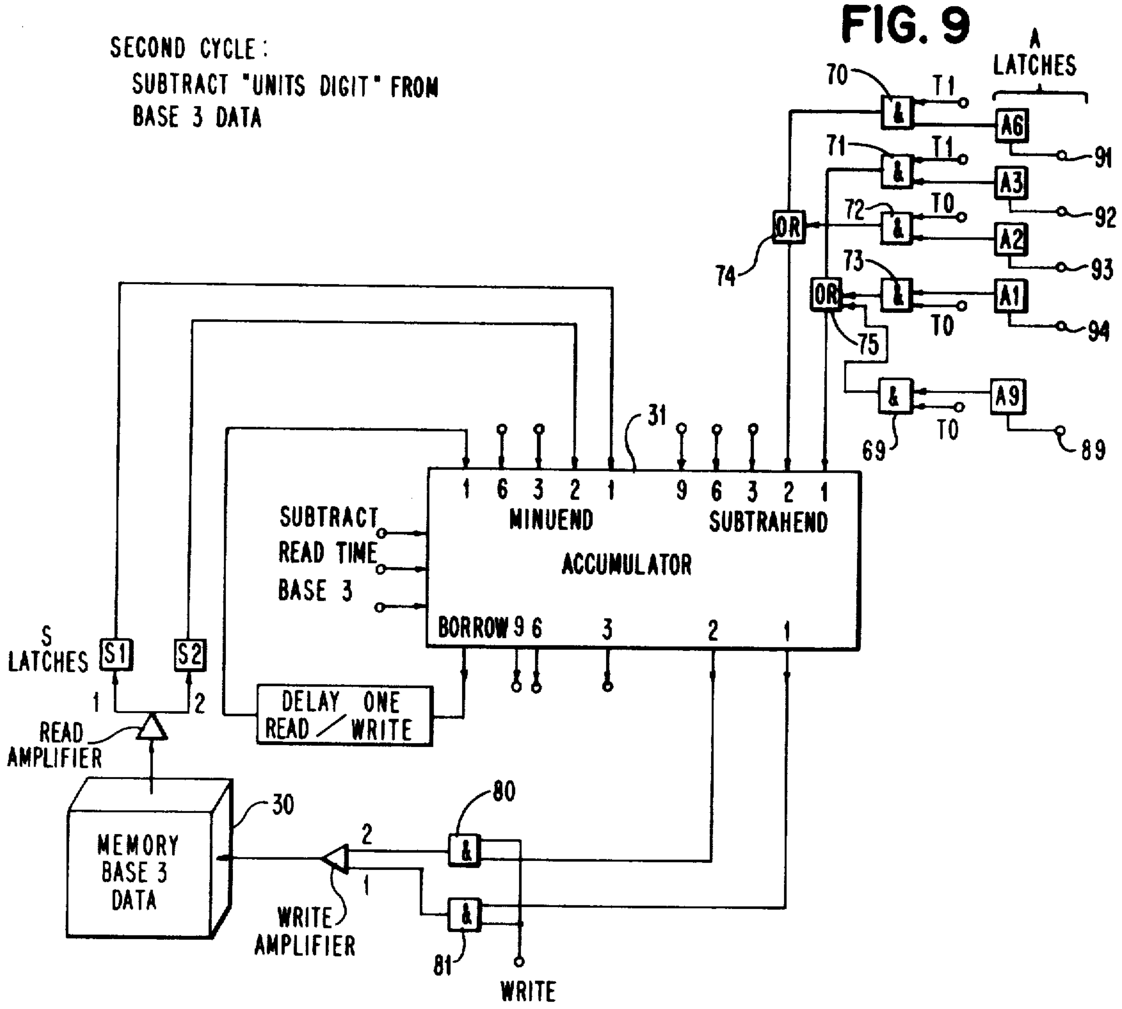
FIG. 9 shows circuits operable to subtract the units digit developed during operation of the circuits in FIG. 7 from the base 3 data.

During the second cycle, the previously developed units digit is subtracted from the base 3 data by gating the A latches as shown in FIG. 9. Gating is required only during times To, T1 and T2 and all significant representations in the A latches are applied to the 1 or the 2 input of the accumulator 31 under control of And circuits 69–73, and Or circuits 74 and 75. Accordingly, during time T0, the A1 and A2 latches are gated to the 1 and 2 inputs of accumulator 31, during time T1 the A3 and A6 latches are gated to inputs 1 and 2 of accumulator 31, and during T2 time, the A9 latch is gated to input 1. The resulting data is written into memory 30 by gating And circuits 80 and 81 to develop "0", "1" and "2" representations to memory. As shown in the Table Q, the data returned to memory 30 will be a "96" represented in base 3, that is, " 101" minus "5". The units digit is supplied to a utilization device by leads 89–94, FIG. 9.

Table R shows the shifting of the data during the third cycle of conversion as illustrated in FIG. 10 includes a "delay 1" circuit 90 for delaying the base 3 from memory 30 for one cycle as required. The clock times are reversed as before, to times T7–T0 as shown in FIG. 11.

Table S illustrates the fourth and final cycle for conversion of the first digit with the circuits involved illustrated in FIG. 12. In this case, the N* resulting from cycle 3 is divided using subtraction of a developed subtrahend under control of And circuits 95 and 96, FIG. 12, that are gated during a base 3 to base 12 conversion. In the illustrated case, the conversion of the decimal number 101 stored in base 3 in memory 30 to base 12 results in the development of a base 12 remainder of "5" and a storage in memory of an "8" representation in base 3. Since the number remaining in memory 30 is less than the base to which conversion is being accomplished, that is, the number "8" is less than the base 12, the number as stored is ready to be supplied in base 12 form simply by the units digit procedure and no further shifting or division of the number is necessary. This completes the conversion of the base 3 data to base 12.

CONVERSION OF BASE 3 DATA TO BASE 10

The base 3 (radix C) data stored in memory 30, FIG. 7, can readily be converted to base 10 (radix $m2$) is desired, by appropriate gating by switch 66, FIG. 7*a*, of the circuits shown in FIGS. 7–12. The clock times are comparable to those shown in FIGS. 8 and 11. After the units digit in base 10 is developed and subtracted from the base 3 data, no shift is required and therefore the third cycle can be omitted. In the fourth cycle the number N which is synonomous with N* is divided by 10 by gating And circuits 97 and 98, FIG. 12.

ACCUMULATOR CIRCUITS, CLOCK CIRCUITS, AND LOGIC

Reference is now made to FIGS. 13–32 that illustrate various circuits that are useful in the conversion circuits discussed in connection with FIGS. 1–12. FIGS. 13 and 14 show a basic flip-flop (trigger) stage with the customary bistable action illustrated in FIG. 14. FIG. 15 illustrates a flip-flop and driving oscillator circuit for developing Read-Write impulses. FIG. 16 shows a ring clock comprising eight stages designated T0 through T7. FIG. 17 is a timing diagram for the clock circuit of FIG. 16. FIGS. 18 through 23 illustrate an accumulator circuit and associated logic that is a preferred form for use with the conversion circuits of FIGS. 1–6 particularly involving the conversion of base 2 data to either base 10 or base 12 data. FIGS. 24–32 comprise an accumulator and associated logic for use in the second embodiment disclosed herein in connection with FIGS. 7–12 in which the conversion of base 3 data to either base 10 data or base 12 data was discussed.

BASIC FLIP-FLOP OR TRIGGER CIRCUIT

FIG. 13 illustrates a basic flip-flop or trigger circuit X designated 102 that provides X1 and Not X1 outputs that represent universal outputs applicable in various ones of the trigger circuits used in the present case. Flip-flop 102, as an example, can serve as one of the individual stages in the clocking ring of FIG. 12, as an example. As is customary, flip-flop 102 has gating inputs at terminals 103 and 104 serving to condition the flip-flop for a change in state upon arrival of a negative going pulse at terminal 105. This is also referred to as a synchronizing or "sync" pulse. FIG. 14 shows the repetitive and alternative changes in the state of flip-flop 102 and illustrates the X1 and Not X1 outputs together with the gating conditions and the sync pulses.

READ-WRITE TRIGGER

FIG. 15 shows a trigger 106 that is driven by an oscillator 107 in a manner somewhat comparable to the trigger 102 in FIG. 13 to develop a series of pulses as indicated at 108, designated Read and Write pulses. The Write intervals are also referred to as Not Read.

RING CLOCK

A ring clock that is useful for developing the T0 through T7 and alternatively the T7 through T0 time intervals previously discussed in connection with the embodiments of FIGS. 1–12, is shown in FIG. 16. This clock comprises trigger stages T0 through T7 with stages T0, T1, T2, and T7 designated 110–113 being illustrated and stages T3–T6 not illustrated since they are comparable to those shown. The various stages of the clock combine to provide appropriate time intervals T0 through T7 in a sequential fashion under control of gating circuits such as And circuits 115 and 116 and Or circuit 117. As with the basic trigger circuit in FIG. 13, the individual trigger stages of the clock change state upon application of a Not Read impulse such as that applied to terminal 120, FIG. 16. As was discussed in connection with the conversion circuits of FIGS. 1–12, there are some circumstances when it is required that the clock count upwardly, that is, in a timed sequence of T0 through T7, and other circumstances when it is required that the clock count downwardly, as for example, in the sequence T7 through To. This is accomplished by appropriate gating with "UP" signals as at terminal 122 of And circuit 115 or "DOWN" signals as at terminal 123 to And circuit 116. The other stages, such as stages 111, 112, 113, are conditioned in a comparable fashion by appropriate gating of associated logic shown in FIG. 16. FIG. 17 illustrates typical counting action of the ring clock when the UP condition prevails or the DOWN condition prevails.

ACCUMULATOR CIRCUITS AND ASSOCIATED LOGIC FOR USE IN THE CONVERSION CIRCUITS OF FIGS. 1–6 INVOLVING THE CONVERSION OF BASE 2 DATA TO EITHER BASE 10 DATA OR BASE 12 DATA

FIGS. 18–23 illustrate basic accumulator circuits and associated logic for use in the first embodiment described earlier in the present case that involve the conversion of binary (base 2) data to either base 10 data or base 12 data. Accordingly, accumulator 17, FIG. 19 corresponds to the same accumulator as shown in FIG. 1, as an example. FIG. 19 illustrates the accumulator circuits in a block form while FIG. 18 gives a further breakdown of the accumulator 17. Actually, accumulator 17 comprises a basic binary accumulator 130 and an associated Corrective six or four accumulator 131, FIG. 18. The basic binary accumulator 130 is shown in considerably greater detail in FIG. 22 as a four stage accumulator with stages designated with $2^0$, $2^1$, $2^2$, and $2^3$ powers respectively. The basic binary accumulator 130 is capable of both addition and subtraction by appropriate gating at terminals 131 and 132, FIG. 18. A single one of the stages of accumulator 130 is illustrated rather completely in FIG. 20 by logic 135 and represented diagrammatically in FIG. 21 by block 136. Block 136, therefore, is representative of any one of the stages $2^0$ through $2^3$ illustrated in FIG. 22. As is conventional, the accumulator 130 responds to Addend and Augend inputs as well as Carry inputs to develop sum outputs. The outputs of accumulator 130, designated B1–B8 from terminals 140–143, FIG. 22, are then directed to the Corrective Six or Four accumulator stage 131.

A logic table for the basic binary accumulator 130 is presented below.

TABLE U

LOGIC TABLE FOR Sn + An = Bn ACCUMULATOR IN BASE 2

| | Inputs | | Outputs | | |
|---|---|---|---|---|---|
| | ADD or SUB | ADD or SUB. | | ADD | SUB |
| Cn−1 | Sn | An | Bn | Cn | Cn |
| 0 | 0 | 0 | 0 | 0 | 0 |
| 0 | 0 | 1 | 1 | 0 | 1 |
| 0 | 1 | 0 | 1 | 0 | 0 |
| 0 | 1 | 1 | 0 | 1 | 0 |
| 1 | 0 | 0 | 1 | 0 | 1 |
| 1 | 0 | 1 | 0 | 1 | 1 |
| 1 | 1 | 0 | 0 | 1 | 0 |
| 1 | 1 | 1 | 1 | 1 | 1 |

In ADD, Cn and Cn−1 is a "Carry", if = 1
In SUB, Cn and Cn−1 is a "Borrow", if = 1

It is noted that the subtract logic is required only in the first stage $2^0$ at terminal 145, FIG. 22.

The Corrective Six or Four accumulator 131 is shown in considerably greater detail in FIG. 23. This logic responds to the bit outputs of the binary accumulator 130 as well as base 10 and base 12 conditioning signals at terminals 150 and 151, FIG. 18, to provide corrected ultimate sum outputs at the bit terminals designated D1, D2, D4, and D8, corresponding respectively to the weighted bit positions 1, 2, 4, and 8.

A logic table for the corrective Six or Four accumulator circuit of FIG. 23 is presented in Table V below.

TABLE V

*LOGIC TABLE FOR CORRECTIVE SIX OR FOUR ACCUMULATOR

| | 1 BIT | 2 BIT | | | 4 BIT | | | | 8 BIT | | |
|---|---|---|---|---|---|---|---|---|---|---|---|
| | | | | (Carry) | | | | (Carry) | | | |
| | D1 | B2 | D2 | K2 | K2 | B4 | D4 | K4 | K4 | B8 | D8 |
| Base 10 = B1 | 0 | 1 | 0 | | 0 | 0 | 1 | 0 | 0 | 0 | |
| | | | | | | | | | | | 0 |
| ADD 6 | 1 | 0 | 1 | | 1 | 0 | 0 | 1 | 1 | 0 | |
| | | | | | | | | | | | 1 |
| | | | | | 0 | 1 | 0 | 1 | 0 | 1 | |
| | | | | | | | | | | | 1 |
| | | | | | 1 | 1 | 1 | 1 | 1 | 1 | |
| | | | | | | | | | | | 0 |
| Base 12 = B1 | | = B2 | | | | 0 | 1 | 0 | 0 | 0 | |
| | | | | | | | | | | | 0 |
| | | | | | 1 | 0 | | 1 | 1 | 0 | |
| | | | | | | | | | | | 1 |
| | | | | | | | | | 0 | 1 | |
| | | | | | | | | | | | 1 |
| | | | | | | | | | 1 | 1 | |
| | | | | | | | | | | | 0 |

*
. Applied in base 10 if B1, B2, B4, B8 9
. Applied in base 12 if B1, B2, B4, B8 11
. Corrects for the difference between the desired base and base 16 which is inherent in a binary accumulator with 4 bits.
. Dn = Bn if the logic is not applied.

Other aspects of the accumulator circuits of interest involve FIGS. 3 and 6 to which reference is made. In these figures, the only inputs used are the S1 (1 bit) input from storage, the A1 input from the A1 latch, the Carry Delay input (Delayed Carry/Borrow) which is indicated as a CD input in FIG. 19 and the subtract input. The only outputs used in FIGS. 3 and 6 involve the D1 output corresponding to the 1 bit position of the accumulator and the Carry/Borrow outputs corresponding to the output C1 shown in FIG. 19. The terms "Base 2" and "Read Time," FIGS. 3 and 6, are redundant in the logic. The Base 2 input simply indicates that neither a base 10 or base 12 logic is required at that time. The Read Time gating allows a minimum time for the logic circuits to respond. The accumulator arrangements of FIGS. 3 and 6, therefore, comprise only the essential portions of the primary accumulator circuits designated 17 in FIG. 1. The base 10 and base 12 input logic terms, as shown in FIG. 1 for example, are generated as previously indicated in FIG. 1*a* by the system logic whenever conversion from base 2 data is required for a system function, such as printout of the information.

BASIC ACCUMULATOR CIRCUITS AND LOGIC FOR EMBODIMENT OF FIGS. 7–12

FIGS. 24–32 show accumulator circuits and logic for implementing the embodiment of FIGS. 7–12, previously discussed, for the conversion of base 3 data to base 10 data or base 12 data, as desired. As with the accumulator circuits discussed in connection with FIGS. 18–23, the base 3 conversion accumulator circuits involve a base 3 accumulator 150 and a Corrective Eight or Six accumulator portion 151, FIG. 24, together comprising the accumulator 31 in FIG. 25, which corresponds to accumulator 31 illustrated in FIGS. 7–12. As is known in the art, the manipulation of data in base 3 involves the recognition and processing of bits assuming any one of three states designated 0, 1, or 2 in any individual bit position. This is in contrast with the base 2 or binary terminology which utilizes only the 0 and 1 state. The base 3 accumulator 150 is shown in FIG. 30 as comprising three stages having weighted bit values designated with $3^0$, $3^1$ and $3^2$ powers. An individual one of the base 3 accumulator positions is particularly shown as an "$n^{th}$" position illustrated in FIG. 29 in block form and in FIG. 26 in considerably greater detail. The logical implementation of the base 3 accumulator 150 includes all of the circuits shown in FIGS. 27 and 28 for developing the Bn (1), Bn (2), and Cn conditions from terminals 153, 154, and 155, FIG. 28. The output from terminal 153 simply reflects an earlier developed condition at terminal 152 corresponding to a similarly designated terminal in FIG. 27. A logic table for the base 3 accumulator is presented below in TABLE W.

TABLE W

LOGIC TABLE FOR Sn ± An = Bn ACCUMULATOR IN BASE 3

| INPUTS ADD OR SUB. | | | OUTPUTS ADD | | SUB. | |
|---|---|---|---|---|---|---|
| Cn−1 | Sn | An | Bn | Cn | Bn | Cn |
| 0 | 0 | 0 | 0 | 0 | 0 | 0 |
| 0 | 0 | 1 | 1 | 0 | 2 | 1 |
| 0 | 0 | 2 | 2 | 0 | 1 | 1 |
| 0 | 1 | 0 | 1 | 0 | 1 | 0 |
| 0 | 1 | 1 | 2 | 0 | 0 | 0 |
| 0 | 1 | 2 | 0 | 1 | 2 | 1 |
| 0 | 2 | 0 | 2 | 0 | 2 | 0 |
| 0 | 2 | 1 | 0 | 1 | 1 | 0 |
| 0 | 2 | 2 | 1 | 1 | 0 | 0 |
| 1 | 0 | 0 | 1 | 0 | 2 | 1 |
| 1 | 0 | 0 | 1 | 0 | 2 | 1 |
| 1 | 0 | 2 | 0 | 1 | 0 | 1 |
| 1 | 1 | 0 | 2 | 0 | 0 | 0 |
| 1 | 1 | 1 | 0 | 1 | 2 | 1 |
| 1 | 1 | 2 | 1 | 1 | 1 | 1 |
| 1 | 2 | 0 | 0 | 1 | 1 | 0 |
| 1 | 2 | 1 | 1 | 1 | 0 | 0 |
| 1 | 2 | 2 | 2 | 1 | 2 | 1 |

In ADD, Cn and Cn−1 is a Carry, if = 1
In SUB, Cn and Cn−1 is a Borrow, if = 1

The terminology used is defined to allow for the three states that a "bit" can have:

0 state = $\overline{Sn}$ = $\overline{Sn(1)}$ $\overline{Sn(2)}$ — $\overline{An}$ = $\overline{An(1)}$ $\overline{An(2)}$
1 state = Sn(1) — An(1)
2 state = Sn(2) — An(2)
This is in contrast to binary terminology:
0 state = $\overline{Sn}$ — $\overline{An}$
1 state = Sn — An
*n* = the "bit cell" number:
Cell No. 1 - A1 (1) - 1 state - value = 1
A1 (2) - 2 state - value - 2
Cell No. 3 - A3 (1) - 1 state - value = 3
A3 (2) - 2 state - value = 6
Cell No. 9 - A9 (1) - 1 state - value = 6

The "S" Cells only go through S3(2) in the implementation as previously shown herein. S9(1) however is generated from the logic combination S3(1) S3(2).

As indicated, the base 3 accumulator circuits of FIG. 24 further comprise a Corrective Eight or Six accumulator portion 151 that is shown implemented in FIGS. 31 and 32. The ultimate outputs of the accumulator circuit 31, FIG. 25, are designated D1, D2, D3, D6, and D9 and correspond respectively to these same output designations shown in FIG. 31 in particular. Accordingly, the uncorrected outputs of the base 3 accumulator 150 are applied to the appropriate terminals of the correction circuits in FIGS. 31 and 32 to develop the ultimate outputs required. The logic table for the corrective Eight or Six accumulator portion 151 is as follows:

TABLE X
*LOGIC TABLE FOR CORRECTIVE EIGHT OR SIX ACCUMULATOR*

| | D1 | B1(2) | D2 | K2 | K2 | B3(1) | D3 | K3 | K3 | B3(2) | D6 | K6 | K6 | B9 |
|---|---|---|---|---|---|---|---|---|---|---|---|---|---|---|
| Base 10 | =B1(1) | 0 | 1 | 0 | 0 | 0 | 0 | 0 | 0 | 0 | 1 | 0 | 0 | 0 |
| ∴ADD 8 | | 1 | 0 | 1 | 0 | 1 | 1 | 0 | 0 | 1 | 0 | 1 | 0 | 0 |
| | | | | | 1 | 0 | 1 | 0 | 1 | 0 | 0 | 1 | 1 | 0 |
| | | | | | 1 | 1 | 0 | 1 | 1 | 1 | 1 | 1 | 1 | 0 |
| Base 12 | | | | | | | | | | 0 | 1 | 0 | 0 | 0 |
| ∴ADD 6 | =B1(1) | | =B1(2) | | | | =B3(1) | | | 1 | 0 | 1 | 0 | 0 |
| | | | | | | | | | | | | | 1 | 0 |
| | | | | | | | | | | | | | 1 | 0 |

*NOTES:
Applied in Base 10 if Base 3 Accumulator 9.
Applied in Base 12 if Base 3 Accumulator 11.
Corrects for the difference between the desired base and Base 18 which is inherent in the Base 3 accumulator shown.
Dn=Bn if this logic is not applied.

Considering the applicability of the basic accumulator and logic circuits of FIGS. 24–32 in the circuits for the second embodiment of FIGS. 7–12, and particularly in FIGS. 9 and 12, it is noted that in the latter figures, only the inputs A1(1), A1(2), Carry Delay CD (Delayed Carry/Borrow), S1(1), S1(2) and Subtract are required when the data is operated on arithmetically during the second and fourth cycles.

The only outputs required from accumulator 31 in FIGS. 9 and 12 are D1 which is equal to the B1 position, D2 which is equal to the B2 position, and C1 which is equivalent to the Carry/Borrow condition. The inputs "Base 3" and "Read Time" are redundant in the logic with the term "base 3" simply indicating that neither base 10 or base 12 logic is required at the particular times shown in FIGS. 9 and 12.

ALTERNATIVE CONFIGURATION

It is contemplated in the arrangements disclosed that a sharing of various logic can be done for both a base 2 and a base 3 kind of operation when converting from an original base to either one or the other of the selected bases, that is, base 10 or base 12. That is, in the preferred embodiments described herein, each embodiment has had its own individual and independent accumulator circuit with associated logic, one of the independent accumulators 17 being used in connection with the embodiment of FIGS. 1–6 and the other accumulator circuit 31 being used in connection with the embodiment of FIGS. 7–12. It is entirely within the scope of the present case that a common accumulator could be provided with appropriate gating logic and other associated control logic for the purpose of handling either the base 2 data, the base 3 data, or the ultimate data required, that is data in base 10 or base 12.

SUMMARY

The foregoing discussion illustrates the flexibility and usefulness of the present invention. By using the techniques disclosed herein, a number represented in any base can be converted to any other base if the equation given is satisfied. For convenience, the equation is repeated here:

$$m = C^n(PC + l)$$

If the positive integers $P$ and $n$ are selected so that the equation is satisfied, then a number stored in an original base $C$ can be converted to a new base $m$ (base $m1$, $m2$, etc.).

The circuits disclosed herein are representative only in a limited sense of the variety of radix conversion circuits to which the present invention lends itself. By appropriate selection of the weighted positions in the accumulator, such as the 9, 6, 3, 2, and 1 shown in FIGS. 7-12, and by appropriate provision of the required gating networks, and by provision of the required shifting and dividing circuits, a number stored in a first radix can be converted to numerous other radices $m1$, $m2$, etc., as long as the conversion circuits maintain compatibility with the equation given and with the weighted bit representations of the radius involved.

While the invention has been particularly shown and described with reference to several embodiments, it will be understood by those skilled in the art that the foregoing and other changes in form and details may be made therein without departing from the spirit and scope of the invention.

What is claimed is:

1. Radix conversion apparatus for converting a number expressed in a radix 2 to an equivalent value in radix 10 during successive conversion operations, comprising:

mode control means operable to provide signals for controlling conversion of a radix 2 number to a radix 10 number;

an arithmetic unit including an adder and subtractor controlled by said mode control means for adding and subtracting numeric values in radices 2 and 10;

first means controlled by said mode control means and selectively operable in a conversion cycle in response to signals representative of ordinal values of a number (N+R) in radix 2 for gating said arithmetic means to accumulate a units digit (R) representation in radix 10;

means for storing said units digit (R) representation in radix 10;

second means controlled by said mode control means for operating said arithmetic means in a further cycle to subtract said units digit (R) expressed in radix 2 from the number (N+R) in radix 2 to thereby derive N in radix 2;

and a divider controlled by said mode control means and operable in further conversion cycles to divide N expressed in radix 2 by radix 10, to thereby derive a new N+R or R in radix 2.

2. The apparatus of claim 1, further comprising:

cycle control means for cycling successive conversion operations until said radix 2 number has been reduced to zero.

3. The apparatus of claim 1, further comprising:

output means for supplying radix 10 output signals to a utilization device.

4. The apparatus of claim 1 wherein:

numeric values in said radices 2 and 10 are expressed by weighted ordinal representations, and wherein said arithmetic means comprises an accumulator having weighted ordinal positions that are numerically compatible with each of said weighted ordinal representations.

5. The apparatus of claim 4, wherein:

said means for storing said units digit comprises a plurality of latches that serve to store a finally developed units digit, as well as intermediate units digit values as the successive ordinal representations of a radix 2 number are supplied to said arithmetic means.

6. Radix conversion apparatus for converting a number expressed in a radix 3 to an equivalent value in radix 12 during successive conversion operations, comprising:

mode control means operable to provide signals for controlling conversion of a radix 3 number to a radix 12 number;

an arithmetic unit including an adder and subtractor controlled by said mode control means for adding and subtracting numeric values in radices 3 and 12;

first means controlled by said mode control means and selectively operable in a conversion cycle in response to signals representative of ordinal values of a number (N+R) in radix 3 for gating said arithmetic means to accumulate a units digit (R) representation in radix 12;

means for storing said units digit (R) representation in radix 12;

second means controlled by said mode control means for operating said arithmetic means in a further cycle to subtract said units digit (R) expressed in radix 3 from the number (N+R) in radix 3 to thereby derive N in radix 3;

and a divider controlled by said mode control means and operable in further conversion cycles to divide N expressed in radix 3 by radix 12, to thereby derive a new N+R or R in radix 3.

7. The apparatus of claim 6, further comprising:

cycle control means for cycling successive conversion operations until said radix 3 number has been reduced to zero.

8. The apparatus of claim 7, further comprising:

output means for supplying radix 12 output signals to a utilization device.

9. The apparatus of claim 8, wherein:

numeric values in said radices 3 and 12 are expressed by weighted ordinal representations, and wherein said arithmetic means comprises an accumulator having weighted ordinal positions that are numerically compatible with each of said weighted ordinal representations.

10. The apparatus of claim 9, wherein:

said means for storing said units digit comprises a plurality of latches that serve to store a finally developed units digit, as well as intermediate units digit values as the successive ordinal representations of a radix 3 number are supplied to said arithmetic means.

* * * * *